United States Patent [19]
Tozoni

[11] Patent Number: 5,319,275
[45] Date of Patent: Jun. 7, 1994

[54] MAGNETIC LEVITATION SELF-REGULATING SYSTEMS HAVING ENHANCED STABILIZATION FORCES

[75] Inventor: Oleg Tozoni, Rockville, Md.

[73] Assignee: Maglev Technology, Inc., Gaithersburg, Md.

[21] Appl. No.: 991,668

[22] Filed: Dec. 16, 1992

Related U.S. Application Data

[63] Continuation-in-part of Ser. No. 864,258, Apr. 6, 1992, Pat. No. 5,218,257, and a continuation-in-part of Ser. No. 764,734, Sep. 24, 1991, Pat. No. 5,225,726, and a continuation-in-part of Ser. No. 691,431, Apr. 25, 1991, Pat. No. 5,140,208, and a continuation-in-part of Ser. No. 691,430, Apr. 25, 1991, Pat. No. 5,208,496, which is a continuation-in-part of Ser. No. 583,082, Sep. 17, 1990, abandoned.

[51] Int. Cl.$^5$ .......................... H02K 7/09; B60L 13/04
[52] U.S. Cl. ..................... 310/90.5; 104/281
[58] Field of Search ............. 310/12, 13, 152, 90.5, 310/254, 255, 256; 104/281, 282, 283, 286

[56] References Cited

U.S. PATENT DOCUMENTS

| | | | |
|---|---|---|---|
| 3,937,148 | 2/1976 | Simpson | 104/148 MS |
| 4,740,725 | 4/1988 | Charron | 310/88 |
| 4,953,470 | 9/1990 | Yamaguchi | 104/282 |
| 5,043,615 | 8/1991 | Oshima | 310/90.5 |
| 5,067,415 | 11/1991 | Morishita et al. | 104/281 |
| 5,140,208 | 8/1992 | Tozoni | 310/90.5 |
| 5,218,257 | 6/1993 | Tozoni | 310/90.5 |

Primary Examiner—Steven L. Stephan
Assistant Examiner—Matthew Nguyen
Attorney, Agent, or Firm—Kenyon & Kenyon

[57] ABSTRACT

Magnetic levitation self-regulating systems having enhanced stabilizational forces designated for immobile, or forward, or rotational motion and stable hovering of heavy masses (working bodies) in both gravity and weightlessness are proposed. This system includes a stator assembly and a levitator assembly. The stator assembly comprises split iron cores with air gaps between their core shoes fixed on a non-magnetic foundation and magnetic screens in the capacity of which serve superconductive, or permanent magnetic, or non-magnetic conductive strips. The levitator assembly comprises permanent magnets coupled together by non-magnetic couplers and disposed into the air gaps of the stator assembly. The levitator magnets are magnetized across the air gaps of the stator and generate the primary magnetic field, magnetizing the iron cores, which, in turn, create a secondary magnetic field. The magnetic screens change distribution of the primary and secondary magnetic fields in the air gaps. The resulting magnetic field creates a stabilizational forces providing a stable hovering of the levitator without any active control system and additional energy sources.

15 Claims, 19 Drawing Sheets

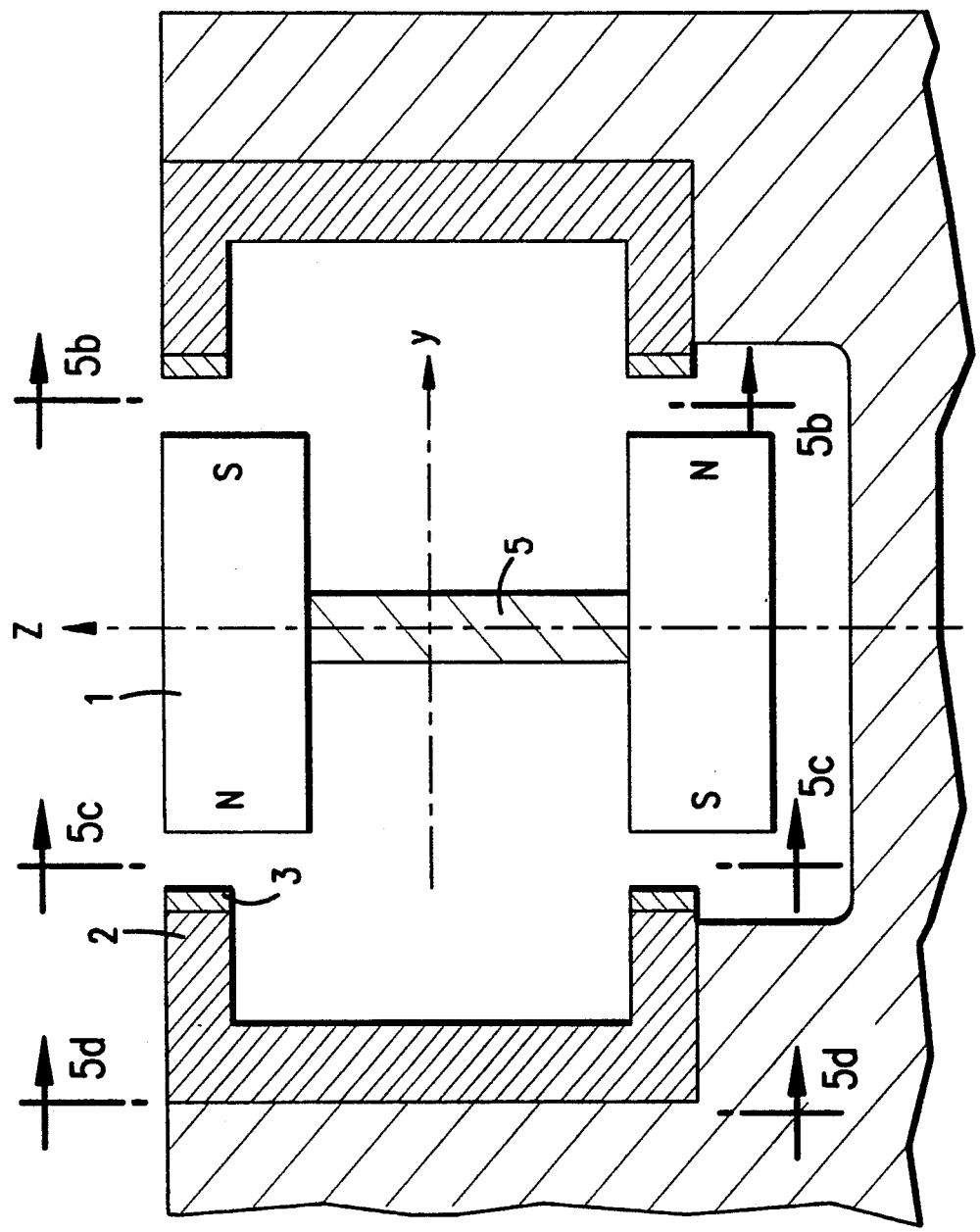

MAGNETIC LEVITATION SELF-REGULATING SYSTEMS HAVING ENHANCED STABILIZATION FORCES

CROSS REFERENCE TO RELATED APPLICATIONS

This application is a continuation-in-part of the following applications:
 a. Application Ser. No. 691,430, filed Apr. 25, 1991, now U.S. Pat. No. 5,208,496, which is a continuation-in-part of Ser. No. 593,082, filed Sep. 17, 1990, now abandoned;
 b. Application Ser. No. 691,431, filed Apr. 25, 1991, now U.S. Pat. No. 5,140,208;
 c. Application Ser. No. 764,734, filed Sep. 24, 1991, now U.S. Pat. No. 5,225,726;
 d. Application Ser. No. 864,258, filed Apr. 6, 1992, now U.S. Pat. No. 5,218,257.

BACKGROUND OF THE INVENTION

The present invention relates generally to magnetic levitation devices and more particularly to magnetic levitation self-regulating systems comprising permanent magnets, ferromagnetic cores and superconductive or permanent magnetic or non-magnetic conductive metallic strips capable of providing the stable hovering of a immobile or/and a moving working body in a magnetic field without any active control system and any energy sources.

To determine the stability of the equilibrium position of any conservative system, Lagrange's theorem is applied [3]. It states that if, in a certain position of a conservative system, its potential energy has a strict local minimum, then this position is that of stable equilibrium of the system.

It is known that the existing magnetic levitation systems of the electromagnetic type use iron cores and electromagnets with an air gap here between. The magnets do not have an equilibrium position therein, and the magnetic field is distributed in such a way as to create destabilizing forces only, tending to attract the magnets to the iron cores.

In order to provide stability to the known systems, a fast-response automatic control system is necessary. Such control is expensive and not reliable at present.

The magnetic levitation self-regulating systems of present invention use different elements from the known systems and include split iron cores with an air gap between their shoes rather than solid cores. Furthermore the present invention uses permanent magnets rather than electromagnets, and so superconductive or permanent magnetic or non-magnetic conductive strips. This structure provides an equilibrium position for hovering body in the air gap and the distribution of the magnetic field therein is capable of creating stabilizing forces only.

A linear synchronous motor having enhanced levitational forces U.S. patent application Ser. No. 764,734, a self-adjusting magnetic suspension for a levitated vehicle guideway U.S. patent application Ser. No. 691,431, and magnetic levitation self-regulating systems U.S. patent application Ser. No. 864,258 serves as examples for these elements.

SUMMARY OF THE INVENTION

The magnetic levitation self-regulating system having enhanced stabilizational forces requires two major components. The first major component is a levitator assembly that includes cylindrical or toroidal permanent magnets having a rectangular cross-section, which are coupled together by rigid non-magnetic couplers. The levitator assembly is the movable component of the levitation system and it is capable of stable hovering in the magnetic field while supporting a heavy mass (i.e., a working body such as a vehicle, rotating part of the magnetic bearings, etc.). The second major component is a stator assembly includes cylindrical or toroidal iron cores, extended along its cylinder or toroid generatrix, with a symmetrical air gap between the core shoes of the cores. All the iron cores of the stator assembly are rigidly connected to one another and are fixed on a non-magnetic foundation, thus forming a stationary component of the levitation system. The permanent magnets of the levitator are disposed in the air gap and magnetized in a direction across the air gap. All the ends of the stator iron core shoes are covered by the superconductive, or permanent magnetic, or non-magnetic conductive strips extended along the stator. The permanent magnetic strips which covered the ends of the core shoes are magnetized in a direction opposite the adjacent permanent magnets of the levitator. The permanent magnets of the levitator generate the original magnetic field and magnetize the stator iron cores. The iron cores create a secondary magnetic field. The strips, which cover the core shoes ends, change the distribution of the magnetic field in such a way that destabilizing forces are reduced. Both the changed original and secondary fields create a magnetic stabilizing force, providing stable hovering of the levitator in the resulting magnetic field.

The stability of the levitator along two or three mutually perpendicular directions is required for different engineering applications: immovable, or forward motion, or rotation motion of the working body and its stable hovering in the vicinity of its equilibrium position. In order to provide stable equilibrium position of the levitator, it is necessary to create a distribution of the magnetic field in the air gaps of the stator cores such that any displacement of levitator from its equilibrium position will instantaneously generate the stabilizing forces tending to restore the levitator. This distribution of the magnetic field is provided by the magnetic screens such as superconductive, or permanent magnetic, or non-magnetic conductive strips. When the magnets of the levitator are immobile the superconductive or permanent magnetic strips serve as a magnetic screens. When the levitator magnets move along a conductive strips, an electromotive force is induced in the strips. In its turn, this electromotive force creates eddy currents in the conductive strip which flow in such a direction as to hinder penetration of the magnetic field through said strips. It follows that conductive strips become the screens for magnetic field during the movement of the levitator. If the magnetic levitation system applied to the magnetic bearing or other applications where size of the stator is small the superconductive or permanent magnetic strips can be used as a magnetic screens that block a magnetic flux.

The properties of any system depend on the properties of its components. The components of the magnetic levitation systems of the present invention comprise:
 a. a magnetic unit formed by cylindrical (or toroidal) permanent magnets having a rectangular cross-section, which are parallel to one another and connected together by a non-magnetic coupler;

b. two identical cylindrical (or toroidal) parts of the split iron cores that are symmetrical and also parallel to one another and which are rigidly connected by non-magnetic couplers in such a way as to form an air gap of constant width between the ends of its core shoes;

c. the cylindrical (or toroidal) superconductive strips, or the permanent magnetic strips, or the non-magnetic conductive strips, which cover the core shoe ends and located opposite the magnetic poles.

Said magnetic unit is disposed in the air gap between the two parts of the iron core and oriented along the gap. The permanent magnets of the magnetic unit are both magnetized across the gap but in a direction opposite to one another.

If the magnetic unit is immobile and symmetrically placed within the air gap and the end butts of the core shoes are covered by the superconductive or permanent magnetic strips, then the distribution of the resulting magnetic field in the gap is such that creates the stabilizing forces only and the total sum of all forces applied to the magnetic unit is equal to zero. Hence, the symmetrical position of the magnetic unit is its equilibrium position.

If the magnetic unit is moving relative to the conductive strips, which cover the core shoe ends, then said strips may become magnetic screens and change the distribution of the resulting magnetic field in such a way as to create stabilizing forces only, tending to reduce the displacement of the magnetic unit from its symmetrical position.

Analytical and experimental investigations has shown that the components of the proposed magnetic levitation system have the following characteristics:

a. any displacement of the magnetic unit along the air gap (within the cross-section of the core) produces a stabilizing force that tends to restore said unit to its symmetrical equilibrium position;

b. the stiffness of the stabilizing force (i.e., the derivative of the force with respect to the displacement coordinate) applied to the magnetic unit in the vicinity of its equilibrium position can be increased from zero to its maximum by changing the length of the coupler between the two permanent magnets in the unit.

By utilizing the above mentioned features of the invention, it is possible to design various magnetic levitation self-regulating systems having enhanced stabilizational forces by connecting similar components (and thus forming the above said stator and levitator) in such a way as to orient the stabilizing forces in mutually perpendicular directions and thus suppress the internal destabilizing and external disturbing forces.

The present invention can be utilized in a wide variety of applications. These applications include magnetic levitation systems for the suspension of a vehicle in high speed ground transportation systems, magnetic bearings that are capable of operating in a gravitational field as well as in a weightless environment, launching systems for the rockets or the space ships, etc. The present invention is equally applicable to different types of magnetic suspension systems.

BRIEF DESCRIPTION OF THE DRAWINGS

FIG. 4b is a partial, cross-sectional view taken along the lines A—A in FIG. 4a; FIG. 4c is a side-view of a portion of the stator core taken along the lines B—B in FIG. 4a.

FIG. 5a is a cross-sectional view of the levitational device constructed in accordance with the principles of the present invention; FIG. 5b, FIG. 5c, and FIG. 5d are the partial side view taken along the lines A—A, (the screens and the stator cores), B—B (the magnetic unit), and C—C (the back of the stator core) respectively in FIG. 5a.

DETAILED DESCRIPTION

The present invention is related to the various types of magnetic levitation self-regulating systems having enhanced stabilizational forces that can be classified by the following criteria:
1. systems that are distinguished by their degree of freedom, which include:
   a. systems possessing two-dimensional stability are used for stabilizing the trajectory of a vehicle (the working body) undergoing forward motion;
   b. systems possessing two-dimensional stability are used for stabilizing the rotational motion of the rotor around the pivot axis without distortion;
   c. systems possessing three-dimensional stability for providing the stable hovering of the working body in the vicinity of its equilibrium position;
2. systems that are distinguished by specific conditions of the application, such as:
   a. systems operating in a gravitational field, which provide forward motion, rotational motion around either the horizontal or the vertical pivot axis, and immovable stable hovering in the magnetic field;
   b. systems operating in weightless environment and performing the same functions as in 2(a) above.

Figure 1:
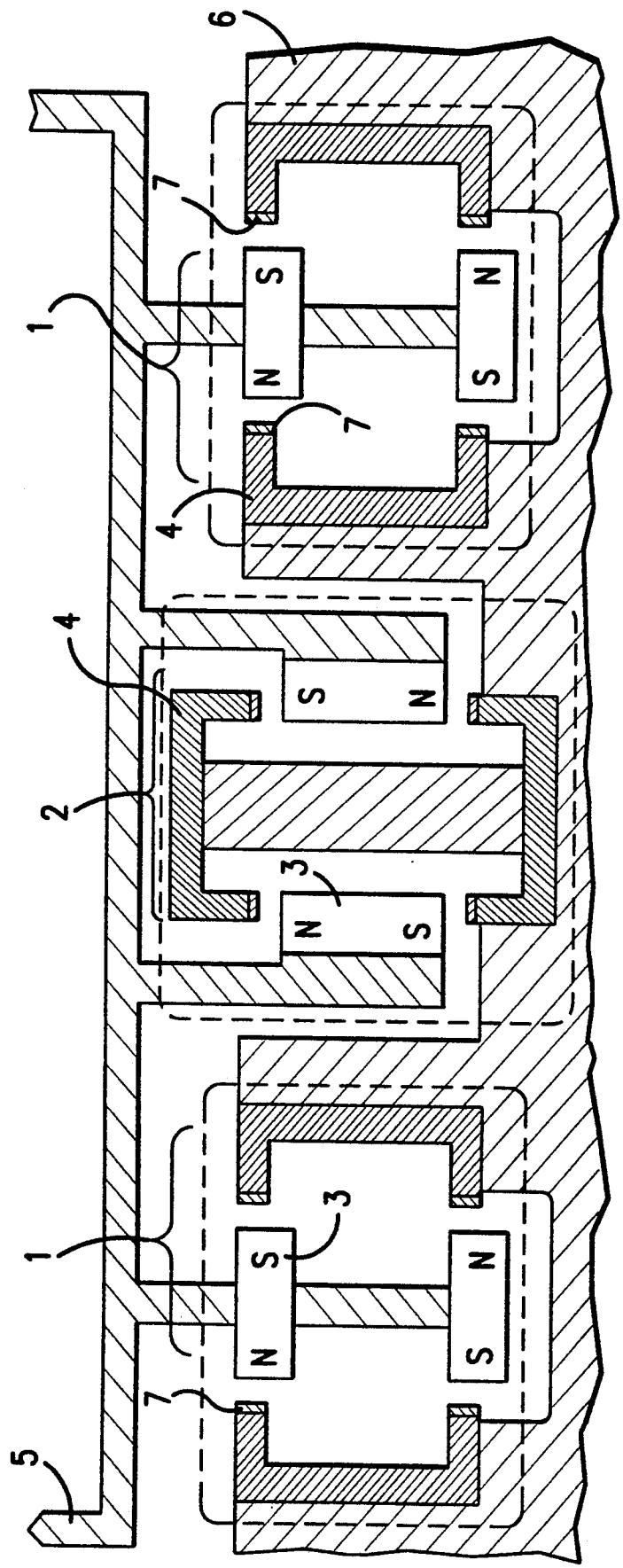
FIG. 1 is a cross-sectional, front view of the moving magnetic levitation self-regulating system constructed in accordance with the principles of the present invention.

In spite of such variety in the types of the magnetic levitation self-regulating systems having enhanced stabilizational forces, their structures are composed of the same components and operate in accordance with to the same principles. As seen in FIG. 1, the magnetic levitation self-regulating system having enhanced stabilizational forces has two major components. The first is a levitator assembly that includes cylindrical (or toroidal) permanent magnets 3 of rectangular cross-section, which are coupled together by the rigid non-magnetic couplers. The levitator assembly, is a movable part of the magnetic levitation system, is capable of stable hovering in the magnetic field and supporting a heavy mass (such as a vehicle or other working bodies). The second major component is a stator assembly includes cylindrical (or toroidal) iron cores 4 that extend along its cylinder (or toroid) generatrix. A symmetrical air gap extends between the core shoes. All the iron cores 4 of the stator assembly are rigidly connected to one other and are fixed on a non-magnetic foundation 6 to form the stationary component of the magnetic levitation system.

The levitator magnets 3 are disposed in the stator air gap and magnetized across the gap (i.e., perpendicular to the longitudinal axis of the magnets). The permanent magnets of the levitator generate the original magnetic field and magnetize the stator iron cores. The iron cores create a secondary magnetic field. To provide steadiness of the levitator assembly it is necessary to create such a distribution of the magnetic fields in the gaps of the stator cores that any displacement of said levitator assembly from its equilibrium position instantaneously generates the stabilizing forces, tending to restore the levitator to its previous position. This distribution of the magnetic field provide the magnetic screens i.e. superconducting, or permanent magnetic, or non-magnetic conductive strips, which covered the core shoe ends.

a. Distribution of the field and generation of the forces

Let us show how to synthesize a levitation system, involving permanent magnets, ferromagnetic cores, and magnetic screens.

We will consider a simple magnetic device (FIG. 2) comprising:

a) a cylindrical iron core of 'C'-shaped cross-section, extended along the cylinder generatrix (axis OX) with a symmetrical air gap between its core shoes;

b) a cylindrical permanent magnet of rectangular cross-section disposed in the gap and magnetized across this gap.

The generatrices of both cylinders are parallel to each other. The distance between the magnetic poles and the core shoes is constant and equal g.

It is known that the force Fn acting in the magnetic field per unit of the surface of the steel unsaturated core ($\mu = \infty$) is determined by formula:

$$F_n = \frac{\mu_0 H_n^2}{2};$$

where $H_n$ is magnetic field intensity in the air that is normal to the core surface.

Figure 3A:
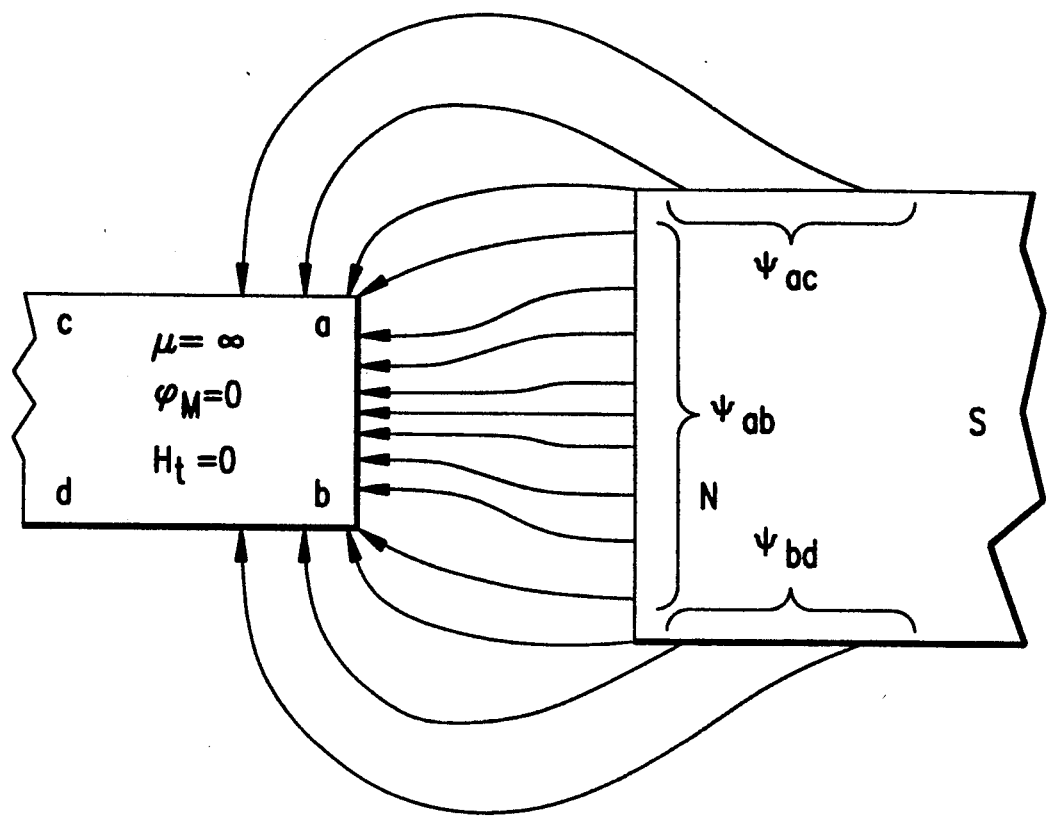
FIG. 3a and 3b are the sketches of the magnetic flux distribution in the air gap between the end of core shoes and pole of the permanent magnet, created by the permanent magnet (FIG. 3a—when the permanent magnet is in symmetrical position, FIG. 3b—when the permanent magnet has a downward displacement)
Figure 3B:
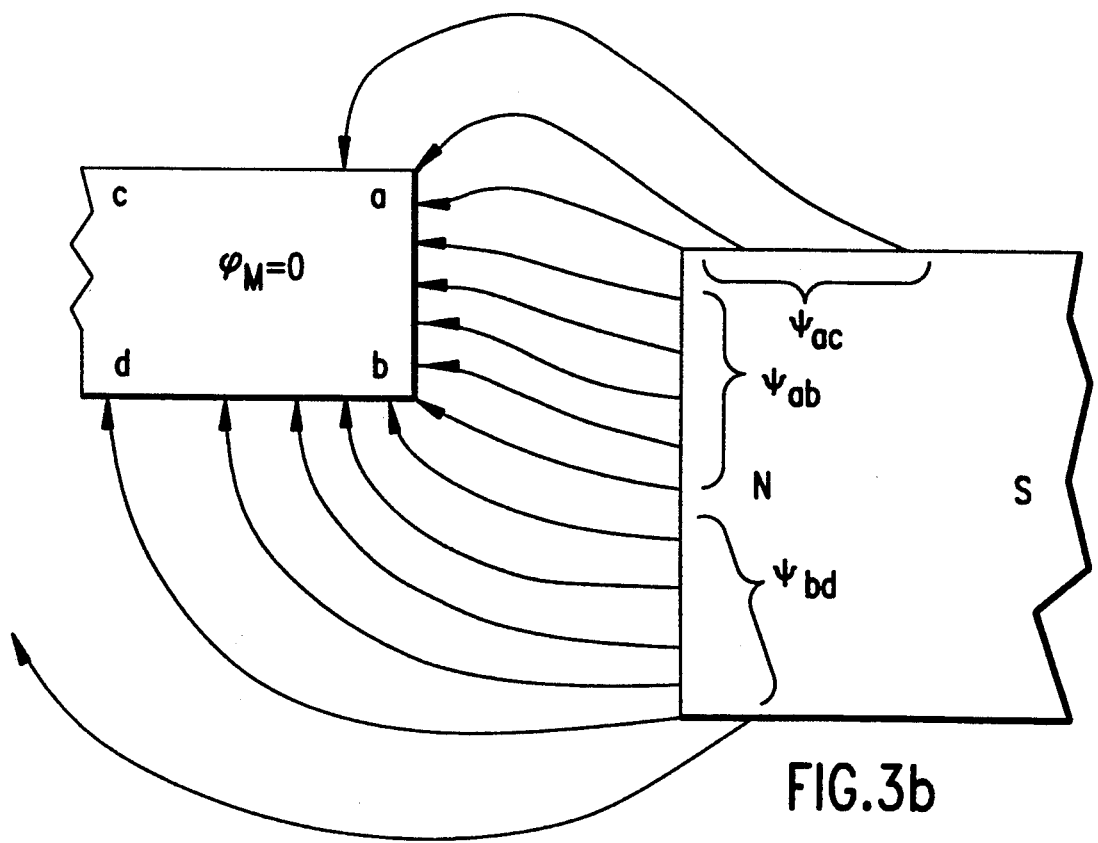

Therefore if the core shoes have the shape shown in FIG. 3a (or 3b) then that part $\Psi_{ab}$ of the magnetic flux which penetrates into the core through its surface (ab) causes the force $F_d$ to arise, while two other parts of said magnetic flux ($\Psi_{ac}$ and $\Psi_{bd}$), penetrate into said core through its surfaces (ac) and (bd) from above and below respectively, causing the force $F_s$ to arise. When displacing the magnet downwards said magnetic flux $\Psi_{bd}$ increases while the flux $\Psi_{ac}$ decreases and their difference ($\Psi_{bd} - \Psi_{ac}$) creates the levitating force $F_s$.

Figure 3C:
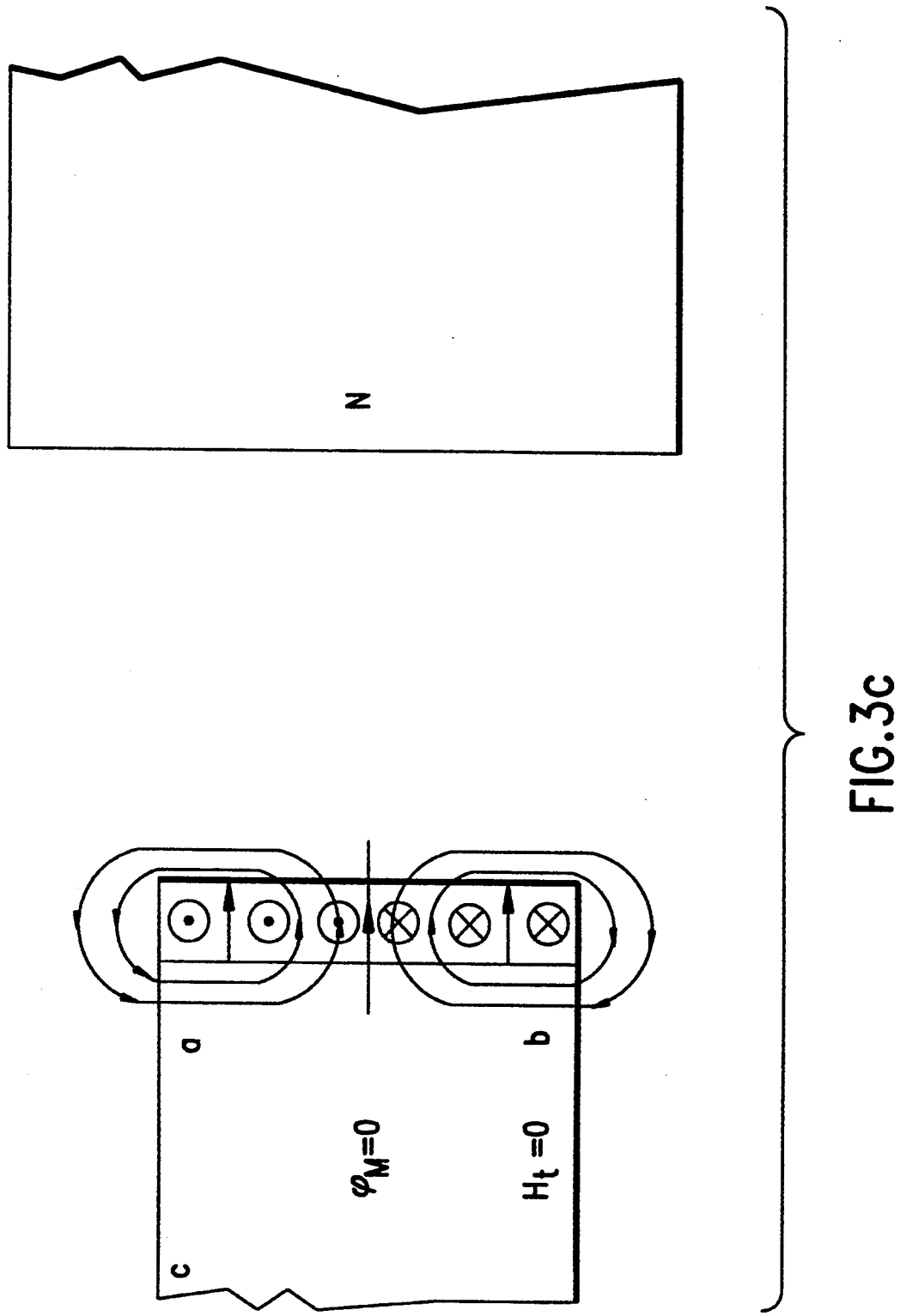
FIG. 3c is the distribution of the magnetic field generated in the air gap by the current induced in the superconductive strip or by molecular currents in permanent magnetic strip or by eddy currents induced in the moving conductive strip.
Figure 3D:
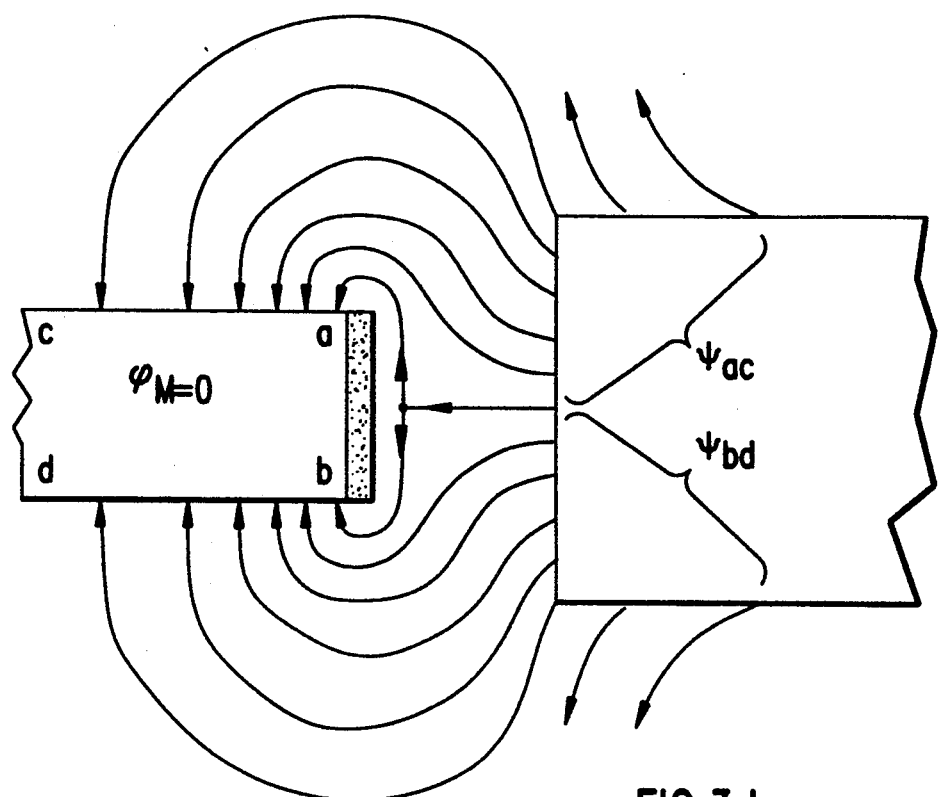
FIG. 3d and 3e are the distribution of the resulting magnetic flux generated in the air gap by both the permanent magnet and the induced or molecular currents in the strips.
Figure 3E:
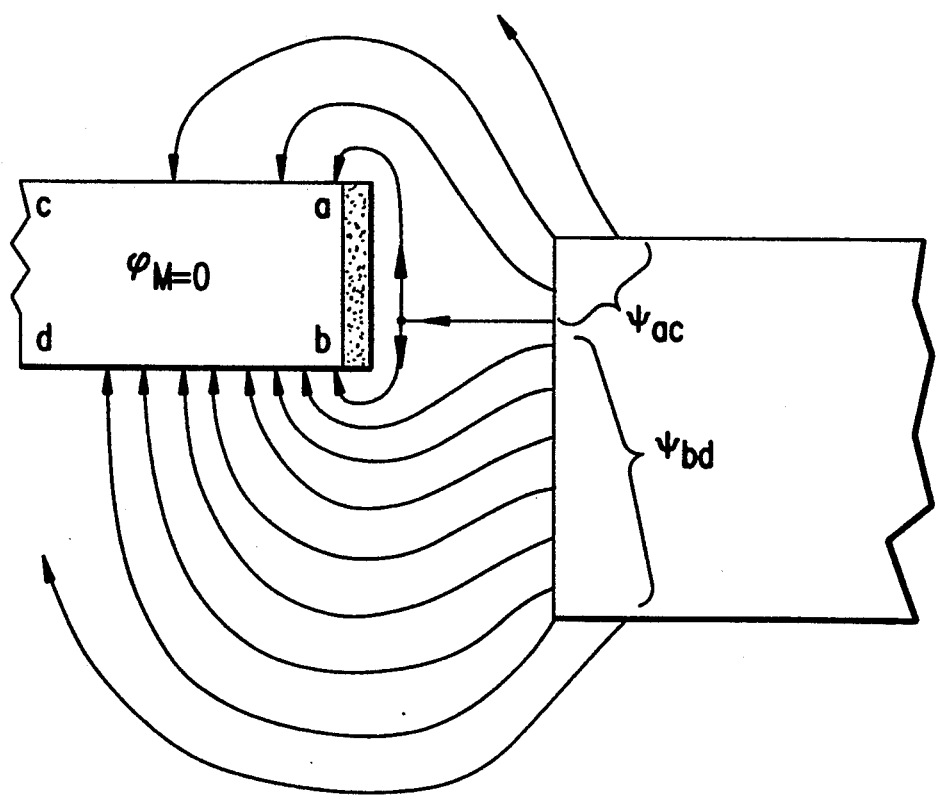

Hence, if the surface (ab) is covered by a magnetic screen (FIG. 3c) that does not permit the magnetic flux to penetrate into the core body, and the magnetic flux $\Psi_{ab}$ diminishes to zero as does force $F_d$.

At present it is very expensive to use superconductive or permanent magnetic screens in the long stator. However when moving a conductive non-magnetic metallic plate along a magnetic pole, this plate screens the magnetic field the more effectively the higher speed of its relative motion. For example, a thin copper or aluminum moving strip covering the surface (ab) serves as an effective magnetic screen if its speed exceeds 10 m/sec.

When the magnet creating magnetic field moves along a thin conductive strip so that induction B is oriented normally to both the speed V of the movement and the plain of strip (see FIG. 3c), an electromotive force e is induced in the strip:

$$e = Bvl,$$

where l is the strip width. In its turn, this electromotive force creates eddy currents which flow in such a direction as to oppose penetration of the magnetic field variation through said strip. Thus the conductive strip moving along the magnet can serve as a magnetic screen blocking the magnetic field penetration into the core shoe created by the magnet. In covering fragment (ab) of the core surface by conductive strip we do not permit the magnetic flux $\Psi_{ab}$ to penetrate it and we thus reduce the force $F_d$.

The permanent magnet moving along straight conductive strip is supposed to have shape of a long cylinder uniformly magnetized along its whole length. Let us separate out a small fragment of the said strip that is being passed by the magnet front edge at the moment. The electromotive force induced in this fragment is of the same value and direction as in the all preceding and following fragments. This electromotive force generates eddy currents in the strip which can be closed only ahead of the front and behind of the back edges of the magnet, since said electromotive force prevents the eddy currents from their closing through the strip within the length of the moving magnet (FIG. 2e).

Figure 2A:
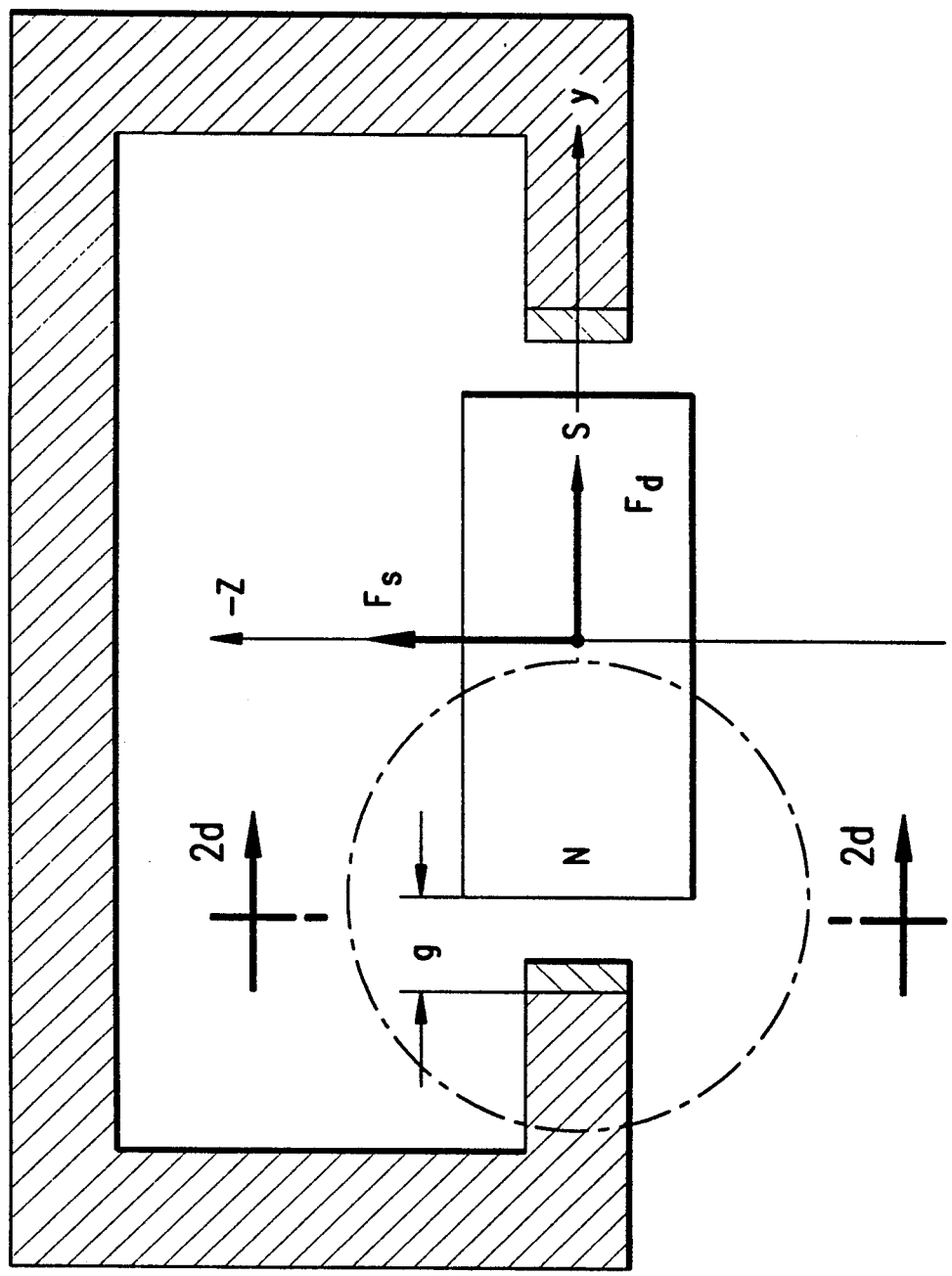
FIG. 2a is a cross-sectional, front view of a simple magnetic device used as a component of the moving magnetic levitation self-regulating system.
Figure 2B:
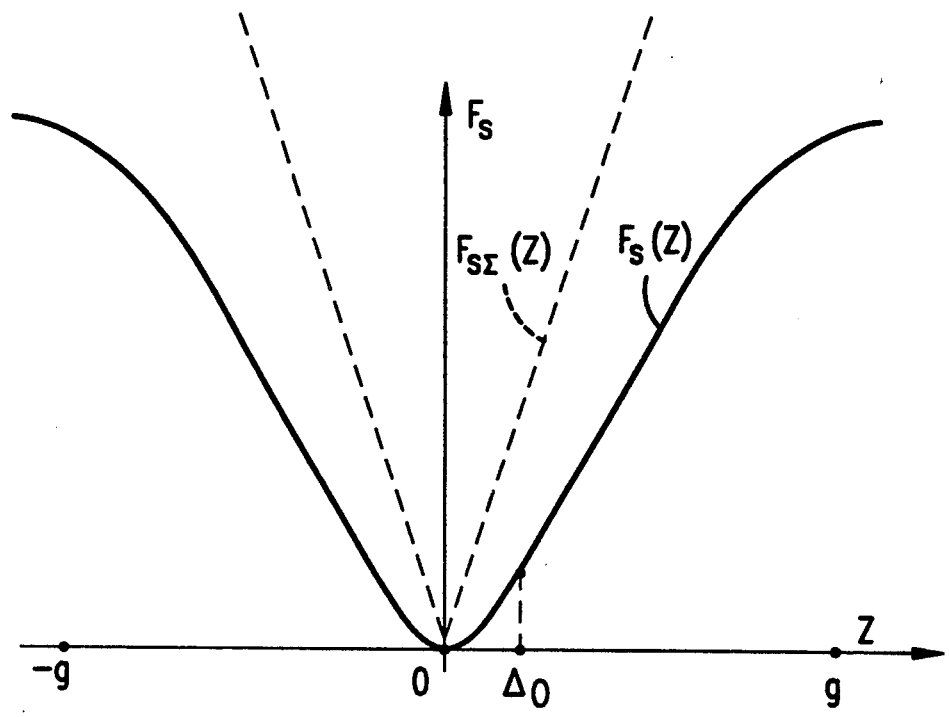
FIG. 2b is a graph profile of the stabilizing force distribution as a function of the displacement of the magnet along the gap.
Figure 2C:
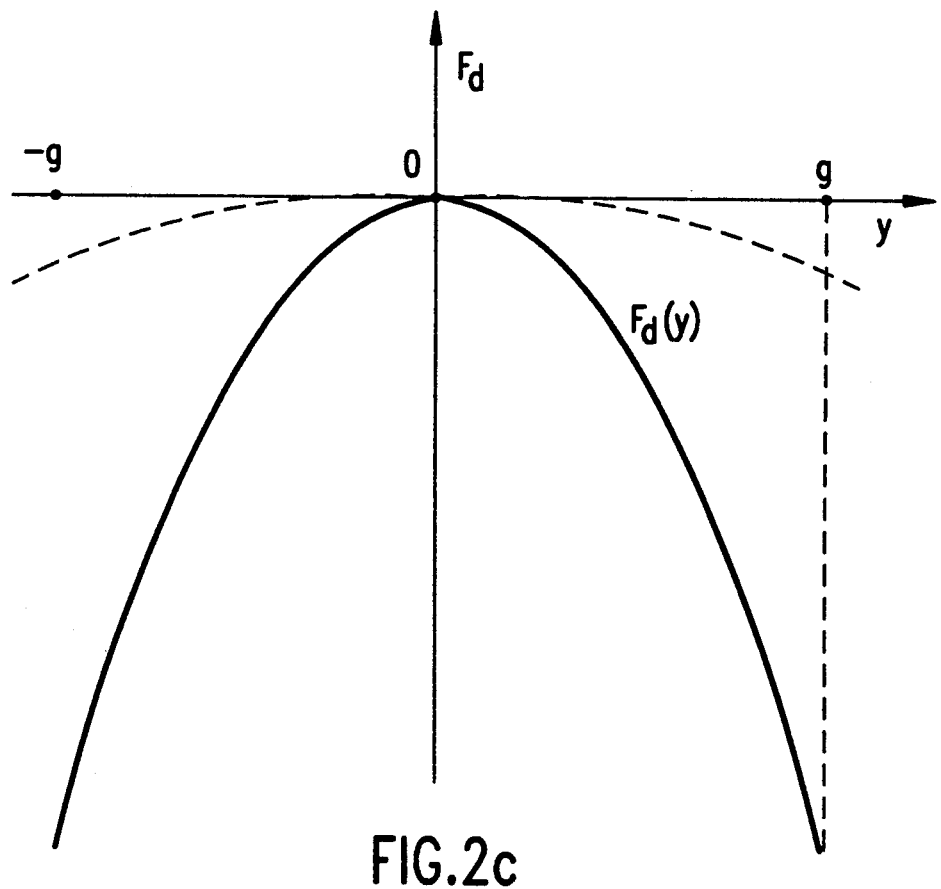
FIG. 2c is a graph profile of the destabilizing force distribution as a function of the displacement of the magnet across the gap; 2d is the distribution of the magnetic poles along the moving magnets and eddy current loops in the conductive strip.
Figure 2D:
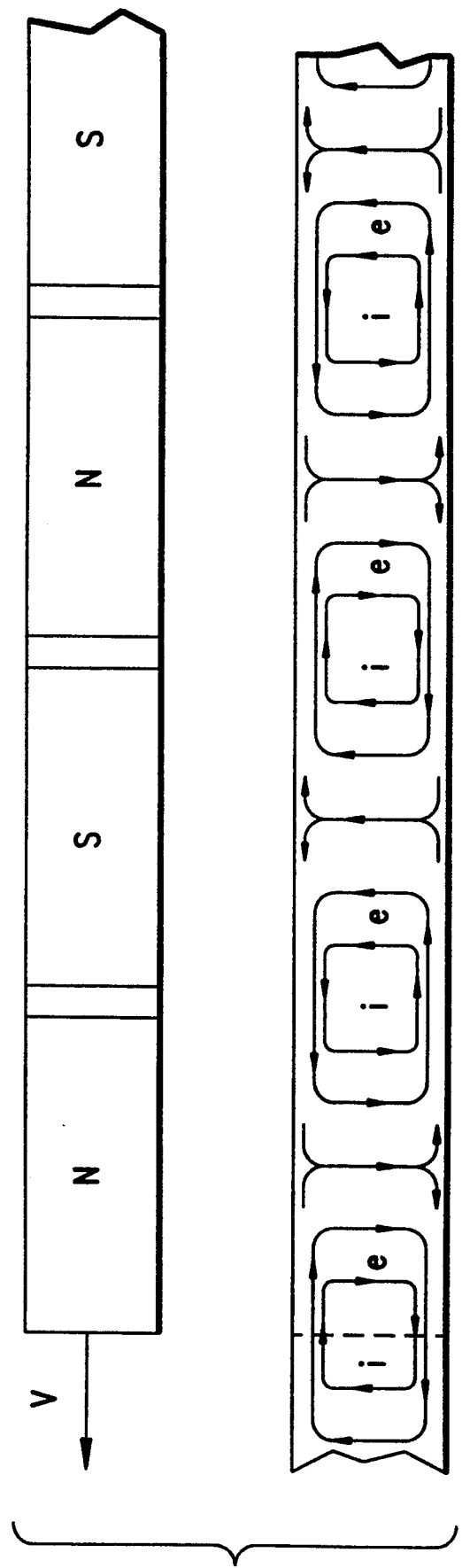

When the permanent magnet moving, said fragment changes its position backwards to the magnet. At the same time the resistance of the eddy current loop increases, reaches its maximum value (when the center of the said fragment coincides with the center of the magnet along its length) and then decreases, while the eddy current density as well as efficiency of strip screening will change inversely. Hence, in order to improve the efficiency of screening, the eddy current density should be increased that can be achieved by composing the magnet from short identical pieces of alternating polarity (FIG. 2d).

So, if the simple magnetic device (FIG. 2a) is uniformly bent around its vertical axis (in parallel with axis Z), thus converting the magnet and core with the strips into closed toroidal body, then rotation of the magnet with regard to the core will induce the constant identically directed across the strip electromotive force which is to generate eddy currents there. Therefore in such device the strip can not serve as the magnetic screen. For the same reason the steel core of the magnetic bearing can be made as a solid body rather than a laminated one. This solid core can be served as a damper for the disturbing oscillation of the levitator.

In reality it will be sufficient to lower the induction $B_n$ (that is normal to the surface (ab)) down to $\frac{1}{3}$ of its value when the magnet is motionless. Then, depending on square of induction, the force $F_d$, is suppressed as many as 9 times and thus is virtually negligible.

At the same time the magnetic field blocked by the screen is forced to bend round the screen from below and above and to penetrate into the core through the fragments of its surface (ac) and (bd). The part $\Psi_{ab}$ of the magnetic flux which previously created force Fd now changes direction and closes on fragments (ac) and (bd) increasing magnetic fluxes $\Psi_{ac}$ and $\Psi_{bd}$. The induction increases on these fragments, increasing the value and stiffness k $$\left( k = \frac{dF_s(z)}{dz} \right)$$

of the force $F_s$. The distribution of the magnetic flux in this case will take a shape shown in FIG. 3.

b. Characteristics of the forces acting on the magnet

As a consequence of the device symmetry (FIG. 2a), force $F_s$ is equal to zero, wile forces $F_{dl}$ and $F_{dr}$ attract the magnet to both core shoes equal to each other. Therefore the sum of all forces applied to the permanent magnet are equal to zero when the permanent magnet is in a symmetrical position. This means that the symmetrical position of the magnet is its equilibrium position.

If the magnet along axis OZ is displaced by distance z, then force Fs(z) appears. The direction of this force is opposite to the magnet displacement and tends to move the magnet back to its initial symmetrical position. Therefore this force is referred to as the "stabilizing force". The profile of $F_s(z)$ as a function of magnet displacement z is shown in FIG. 2b. The stabilizing force in this figure and all following is assumed to be oriented upwards.

The stiffness of the stabilizing force in said device increases as the magnet displacement increases, reaching a maximum km under a certain displacement $z = \Delta_0$, (abscissa of the inflection point of the curve $F_s(z)$) and then decreases, although the displacement continues to grow.

Displacement of the magnet in a traverse direction along axis OY by distance y, generates "destabilizing force" $F_d(y)$ which tends to increase this displacement. Analysis has indicated that the profile of $F_d(y)$ as a function of the magnet displacement y is shown in FIG. 2c. During the movement of the magnet the conductive screen suppresses the destabilizing force (FIG. 2c). The destabilizing force in this figure and all following is assumed to be oriented downwards.

The stabilizing and destabilizing forces affect the magnet in two reciprocally perpendicular directions. Thus, that two devices located reciprocally perpendicular to each other, with their cores and magnets connected separately by rigid non-magnetic ties, could create a stable levitation system suppressing the destabilizing forces (which are reduced by conducting screens) with the stabilizing ones.

c. Methods of rising system components stability

In order to increase safety of stable system it is necessary to have magnetic devices with a maximum stabilizing force stiffness in the vicinity of the equilibrium position of the magnet.

In order to increase to a maximum degree the stiffness of the stabilizing forces we can accomplish a preliminary shift of the magnet from equilibrium position to the position corresponding to he abscissa of the inflection point of the stabilizing force profile. There are two ways in which to make this preliminary shift:

a. the structural shift, determined by the length of the tie;

b. the shift affected by the weight of the working body.

To explain "a.)" in detail let us consider a component (FIG. 4), which consists of two identical simple magnetic devices whose axes arc rotated by $\pi$. Their core shoes are laid in parallel at a distance t between them and rigidly fixed to each other. Their magnets are rigidly coupled in parallel at a distance to and compose a magnetic unit. Once force $F_s(y)$ applied to the permanent magnet of simple magnetic device has been established, it is easy to construct the resulting force $F_{s\Sigma(y)}$ applied to the said magnetic unit.

In reality, the force $F_s(y)$ pulls a single permanent magnet into the gap between the two core shoes and depends only on displacement y of the magnet against its equilibrium position. The force $F_{s\Sigma(y)}$ depends not only on the displacement y of the single magnet but also on the distance $t_0$ between the two magnets in said magnetic unit.

d. Stabilization device

The equilibrium position of the magnetic unit coincides with the symmetrical center of the components, with each magnet preliminary shifted against the center of the air gap of its own core (its former equilibrium position) by the distance $$y = \frac{t - t_0}{2}$$

Figure 4A:
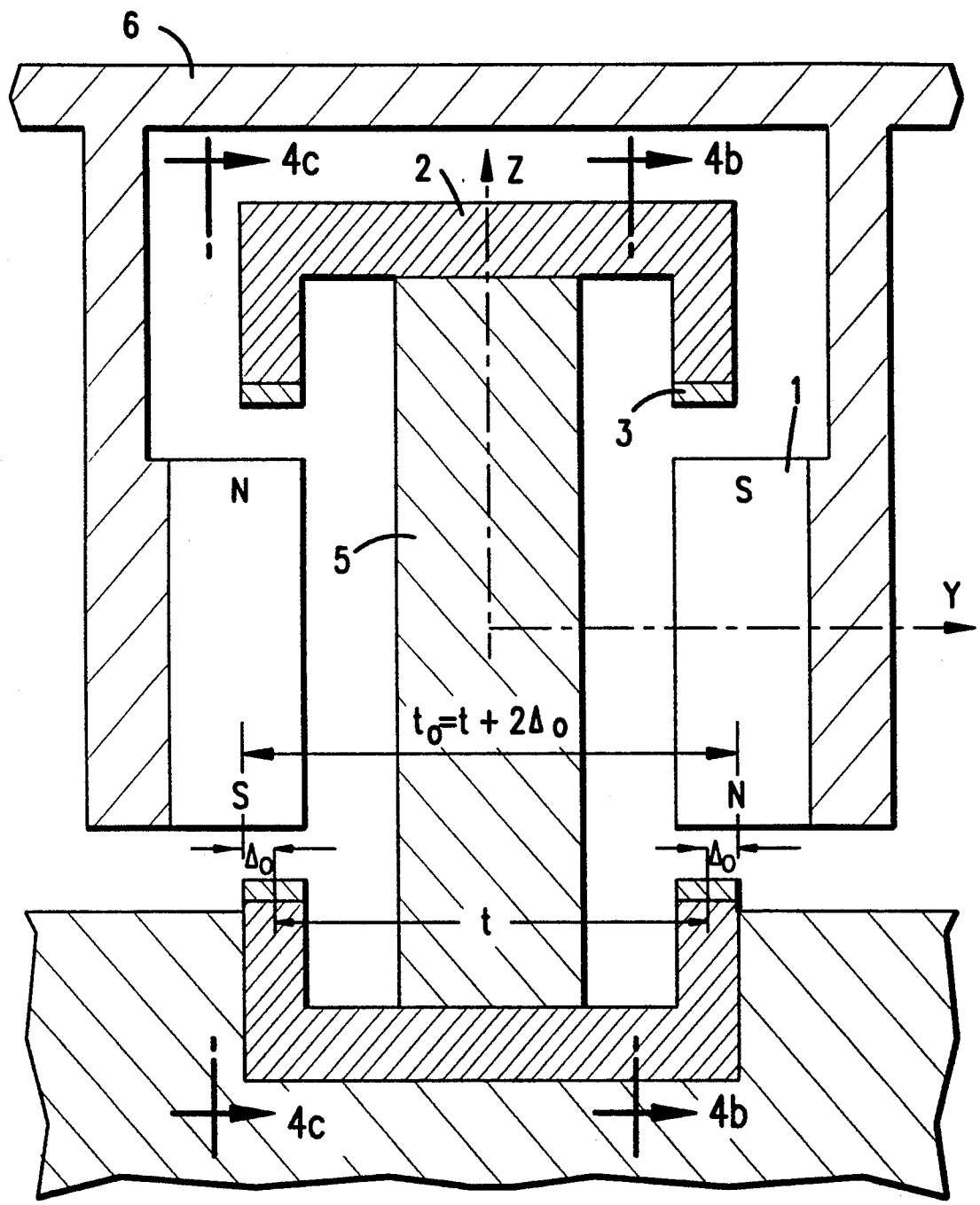
FIG. 4a is a cross-sectional view of the stabilization device constructed in accordance with the principles of the present invention.
Figure 4B:
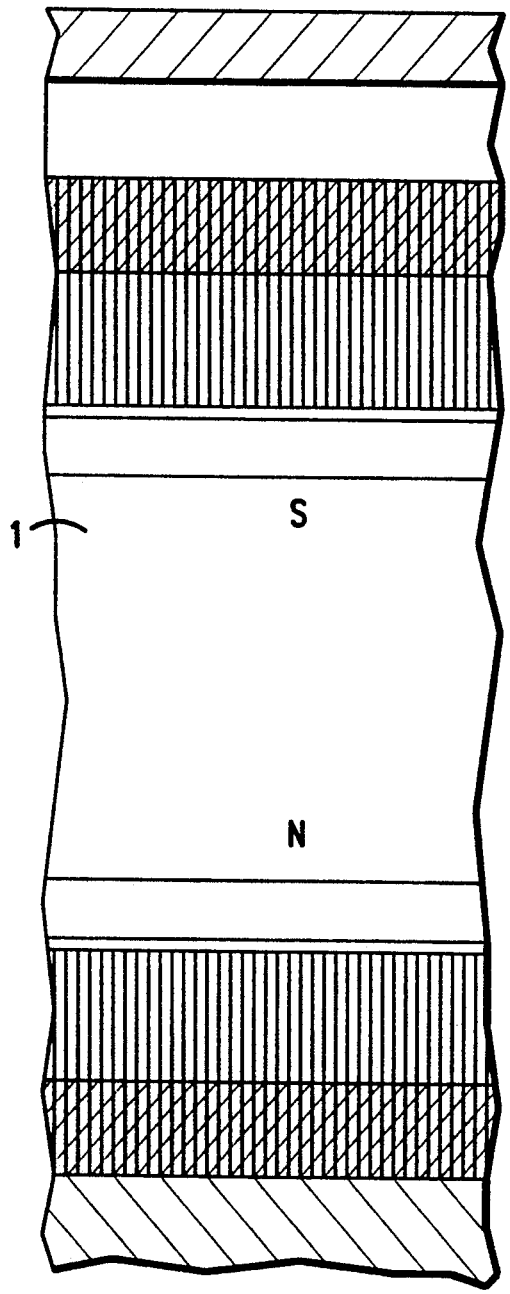
Figure 4C:
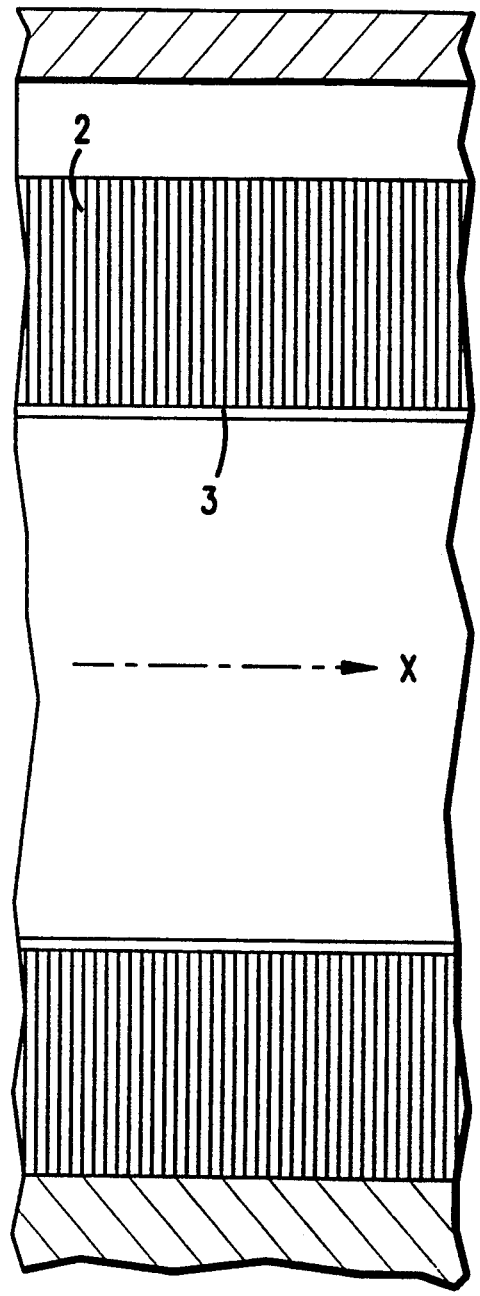

This means that if the magnetic unit is in its equilibrium position, two equal but opposite oriented forces $F_{sl}(y)$ and $F_{sr}(y)$ (on the left and on the right of the magnetic unit respectively) are applied to the coupled magnets. As soon as the magnetic unit starts displacing from the equilibrium position, the one force increases while the other decreases. Thus, under displacement y to the left, force $F_{sr}$ decreases by value $\Delta F_{sr}=k(y)y$, while force $F_{sl}$ increases by value $\Delta F_{sl}=k(y)y$. Here y is a displacement measured as a distance from the position of equilibrium (FIG. 4). The resulting force $F_s(y)$ that tends to return the magnetic unit to the equilibrium position is:

$$F_{s\Sigma}(y)=F_{sl}(y)-F_{sr}(y)=2k(y)y.$$

It is important to note that the stabilizing force stiffness of said component in the vicinity of the equilibrium position can be changed from $k=0$ (under $t_0=t$) to $k=2k_m$ (under $t_0=t+2\Delta_0$), where $\Delta_0$ is the optimum value of preliminary shift of each magnet in the unit (FIG. 2b), i.e., abscissa of the inflection point. This component is called the "stabilization device". The $F_{s\Sigma}(y)$ curve with maximum possible stiffness $k=2k(\Delta_0)=2k_m$ is shown in FIG. 2b by a dotted line.

e. Levitation device

Figure 5D:
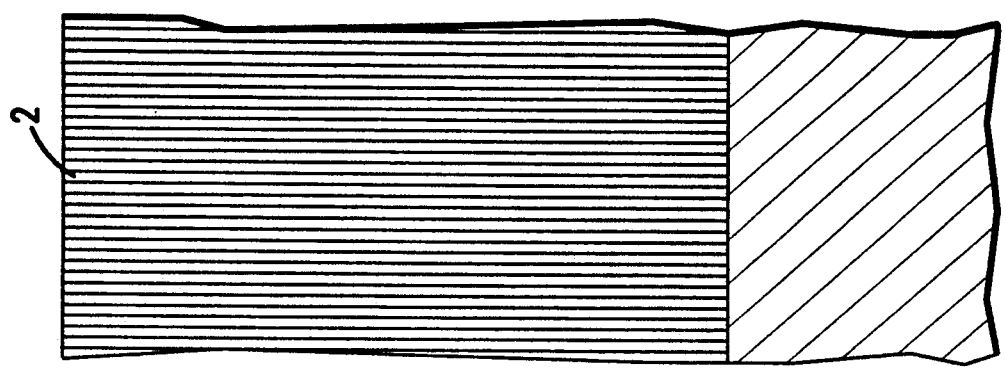
Figure 5C:
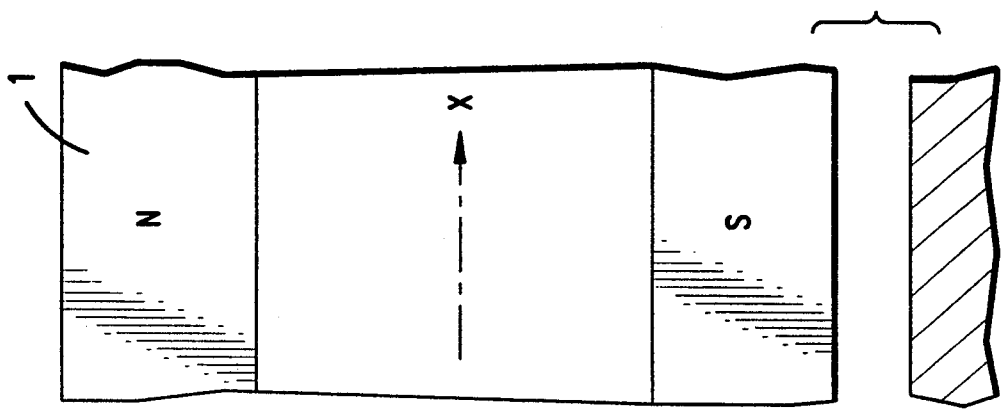
Figure 5B:
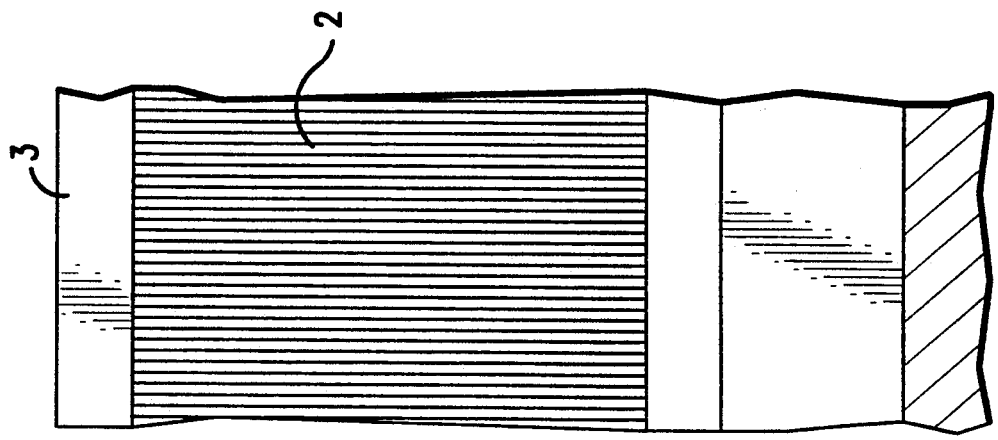

It is also possible to design an component similar to the above mentioned with analogous properties using a gravitational field (FIG. 5). In this component the air gap between the core shoes as well as the stabilizing force have a vertical orientation along the axis OZ, and its iron cores are assembled similarly to the device shown in FIG. 4. In said component the working body, pressing with its weight on the upper magnet of the magnetic unit provides the preliminary shift $\Delta_0$ of this unit downwards-method "b").

In this construction magnetic force $F_s(z)$ serves as a levitational force. This force always equals the total weight W of the magnetic unit and the working body. If the dimensions of the magnets and cores are chosen purely to provide a displacement $\Delta_0$ of the magnets that corresponds to the point of inflection on the original curve $F_s(z)$ (FIG. 2b), the resulting levitational force $F_{s\Sigma}(z)$ equals the sum of magnetic stabilizing forces applied to the upper $F_{su}$ and bottom $F_{sb}$ magnets $(F_x(z)=F_{2nd}+F_{3b})$ and has the profile shown in FIG. 2b by a dotted line. The corresponding levitational force stiffness in the vicinity of the equilibrium position equals a doubled maximum stiffness $2k_m$ calculated for the stabilizing force $F_s(z)$. This component is called the "levitation device".

Figure 6:
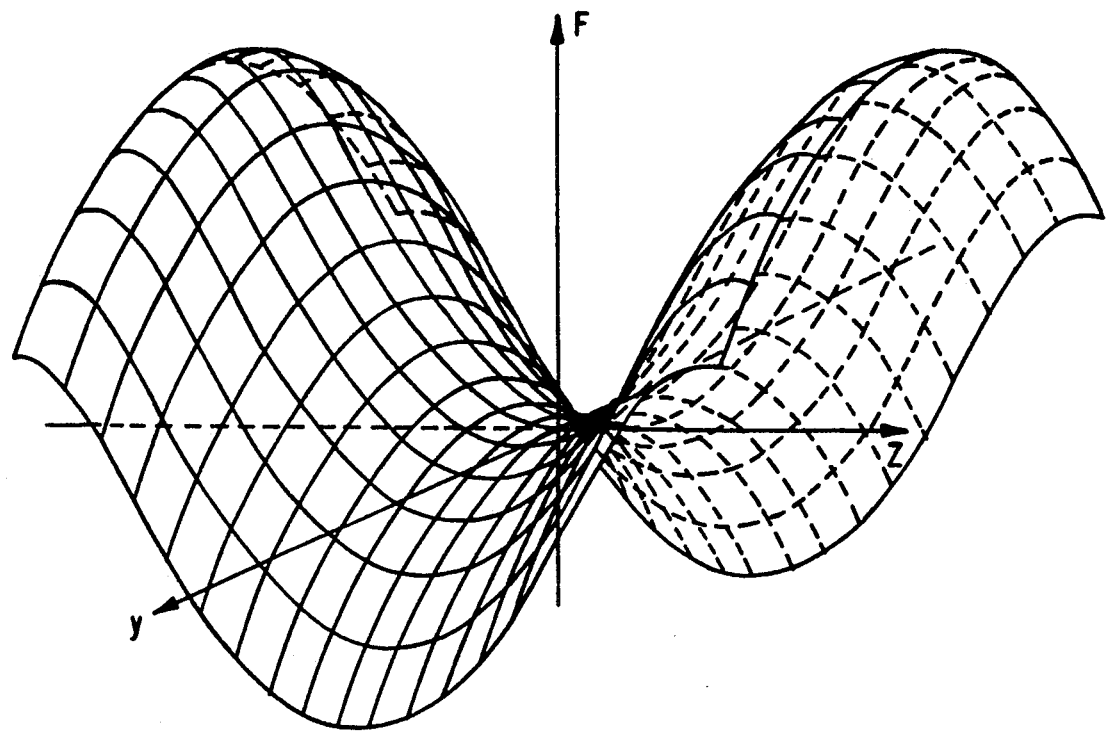
FIG. 6 is a diagram of the magnetic force distribution applied to the permanent magnet as a function of an arbitrary displacement of the magnet in the plane coincident with the cross-section of the gap.
Figure 7:
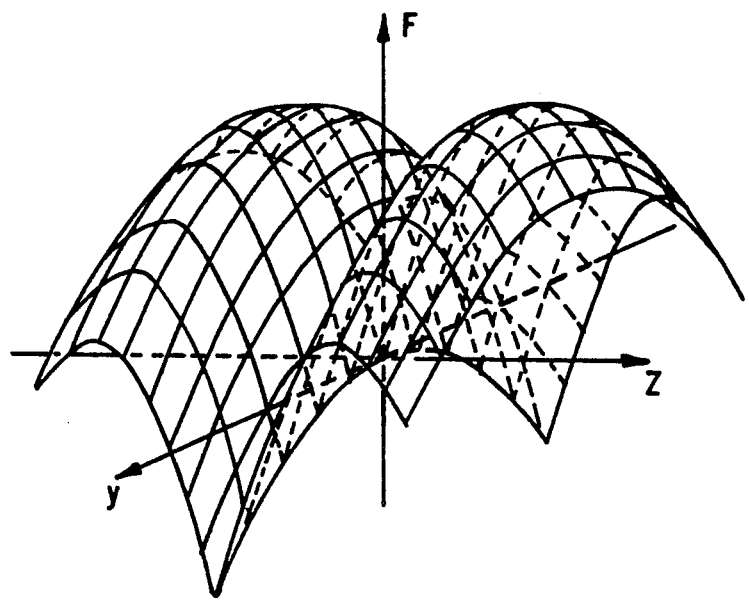
FIG. 7 is a diagram of the magnetic force distribution applied to the magnetic unit as a function of an arbitrary displacement of the magnetic unit in the plane coincident with the cross-section of the gap.

The diagram of the distribution of the force F(y,z) applied to the magnet of the single device (FIG. 2a) depends on its arbitrary displacement on the plane $(x=0)$ and is represented in the form of a saddle-shaped surface with a smooth minimum of the force $F(0,0)=0$ shown in FIG. 6. A rigid coupling of the two similar devices as shown on FIG. 2a allows one to transform this surface into another saddle-shaped surface (FIG. 7) with a sharp minimum of the force $F(0,0)=0$ located in the plane $(z=0)$.

f. Synthesis of the Maglev system

Thus, from the above observed examples (FIG. 4 and FIG. 5), one can see that the utilization of rigid ties and/or a gravitational field makes it possible to create a system with magnetic forces acting in two reciprocally perpendicular directions and tending to restore the levitator to the equilibrium position, thus providing system stability. To achieve this, it is sufficient, for example, to tie rigidly the three components shown on FIG. 1. One of these is a stabilization device, the other two are levitation devices. The stabilizing forces in these three components are reciprocally perpendicular. By varying dimensions of the magnets and cores and fixing the distance t between them it's becomes possible to change the stabilizing force stiffness of the system, thus allowing the use of the horizontal force acting in the horizontal component (stabilization device) to suppress external horizontal disturbing forces and to prevent the vertical magnetic unit from adhering to the cores, while the vertical components (levitation device) create vertical forces which suppress external vertical disturbing forces and prevent the horizontal magnetic units from adhering to the cores. Rigid ties and gravity provide force transference from one component to the other and provide safe stable hovering of the levitator in the magnetic field during its movement.

A surface (FIG. 8) corresponding to the resulting force distribution in the system shown in FIG. 1 is created as a result of the intersection of two mutually perpendicular saddle-shaped surfaces (FIG. 7) having sharp minimum.

Figure 8:
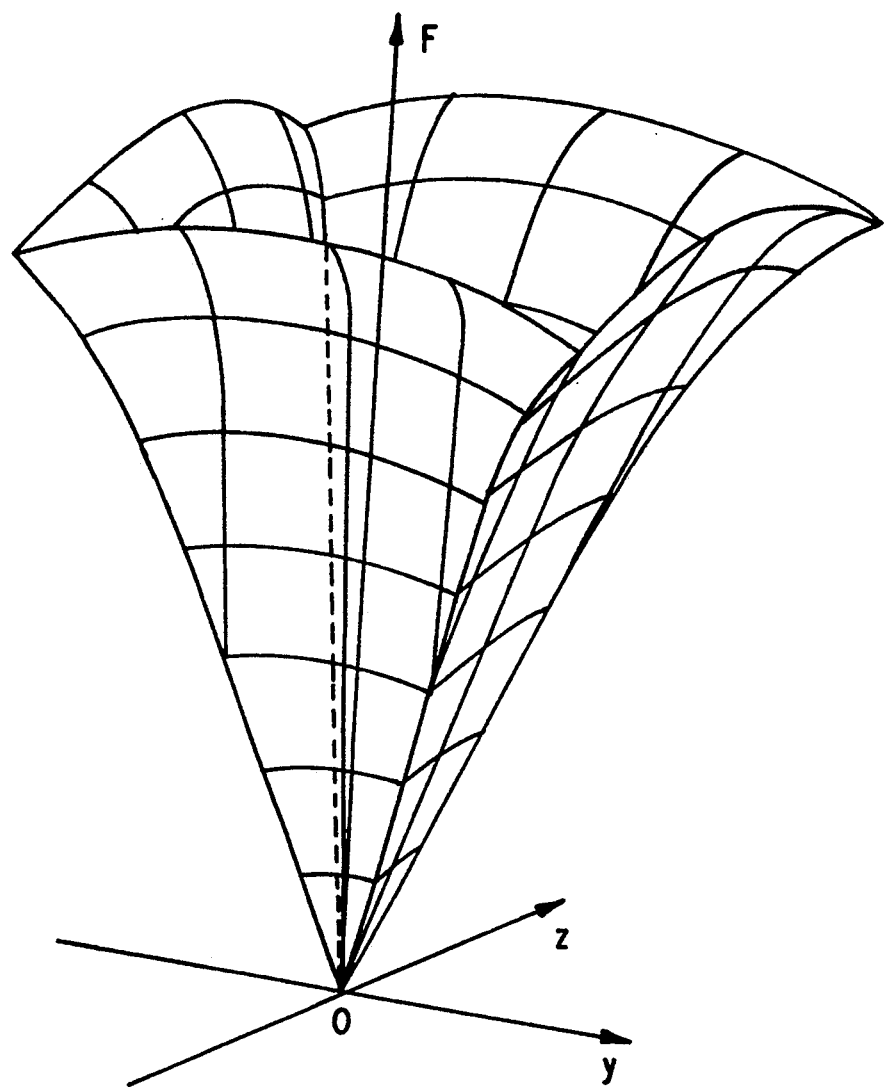
FIG. 8 is a diagram of the magnetic force distribution applied to the levitator of the magnetic levitation self-regulating system having enhanced stabilizational forces designated for high speed ground transportation.

As shown in FIG. 8, under such a combination of components their extreme points coincide with the point of stable equilibrium (origin of a coordinate system at FIG. 8). Composites of the resulting force $F_s(y,z)$ applied to the levitator in this point are:

$$F_{sy}(y,z)=2k_my,$$

$$F_{sz}(y,z)=2k_mz.$$

These forces are oriented upwards because they are directed opposite to the levitator displacement.

The diagram of the system stabilizing force $F_s(y,z)$ distribution is a lateral face of an inverted tetrahedral pyramid (FIG. 8). The top of the pyramid coincides with the origin, its sides are conceived near its foundation. The value of the stabilizing force is proportional to the value of the displacement of a levitator in the plane YOZ. The potential energy of the system (the result of integration of the force $F_s(y,z)$) is therefore represented as a convex parabolic surface in the vicinity of the origin and has a local minimum at this point. This means that the conditions of Lagrange's famous "Theorem of Stability" are satisfied and local stability of the proposed magnetic system is guaranteed.

It is important to point out that because both devices, levitation and stabilization, have a cylindrical shape and further because of the gravitational independence on the coordinates, the following conclusion can be drawn: eliminating only two degrees of freedom along the axes OY and OZ in the system of the invention leads automatically to the elimination of three more degrees of freedom: roll, tilt and pitch.

In reality, turning the levitator around any of the main axes OX, OY or OZ instantly creates the corresponding couple of forces which tend to restore the said levitator to its equilibrium position.

The stable levitation system is designated for forward motion in a gravitational field. To provide the levitation system with stability, its components are provided with the following characteristics:

a. any displacement of the magnetic unit along the air gap (within the cross-section of the core) produces a stabilizing force that tends to return the unit back to its symmetrical equilibrium position and pulls the permanent magnets into the air gap; the stabilizing force increases by increasing the displacement z of the magnetic unit against its equilibrium position. Simultaneously, the stiffness $$k(z) = \frac{dF}{dz}$$

of the stabilizing force increases up to a maximum: $k(\Delta_0) = 2k_m$;

b. the stiffness of the stabilizing force applied to the magnetic unit in the vicinity of its equilibrium position can be increased from zero to maximum by changing the length of the coupler between two said permanent magnets in the unit;

c. the force distribution applied to the magnetic unit, which is a function of the displacement in the gap, has a saddle-shaped surface with a minimum that equals to zero in the vicinity of the origin (i.e., in the equilibrium position of the magnetic unit). Further, the surface can be sharpened (while maintaining its saddle-shape) in the vicinity of the origin by varying the length of the coupler between the magnets.

Figure 12A:
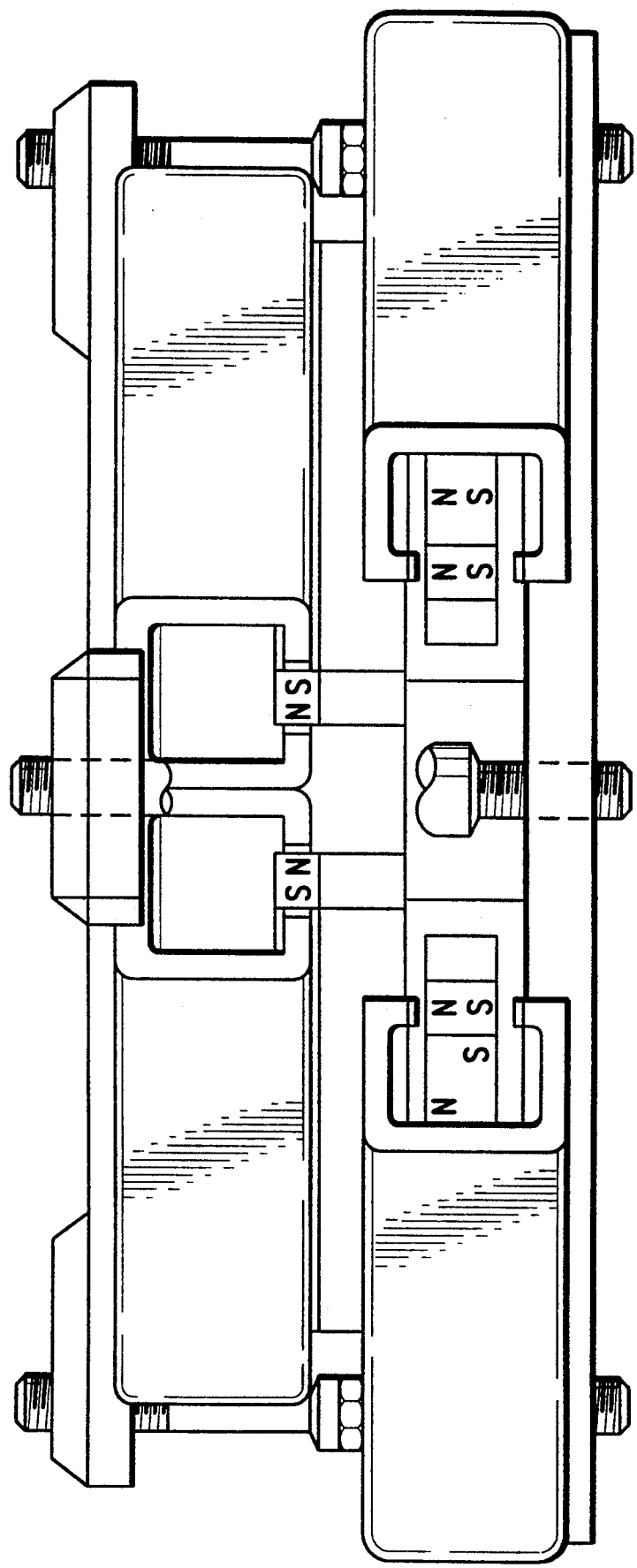
FIGS. 12a and 12b are, respectively, front view and layout of the magnetic levitation self-regulating system designated for stable hovering of a working body in the magnetic field.
Figure 12B:
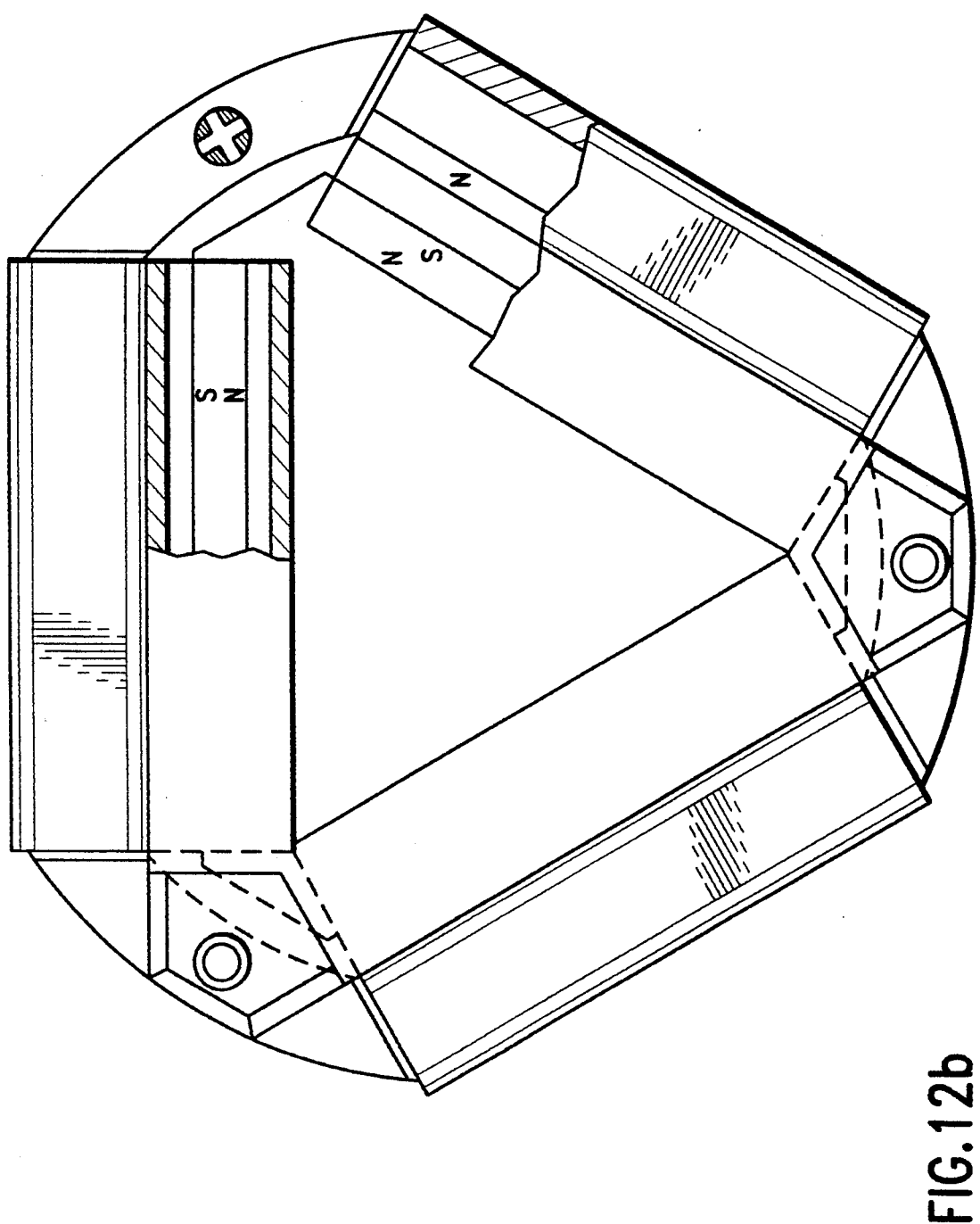

Similarly, it is possible to design a magnetic system which is stable in all three directions. To achieve this stability it is necessary to use permanent magnetic or superconductive strips and rigidly couple the system that is stable in only two directions of the space to the components of FIG. 4 and FIG. 5 which are oriented along the third direction. FIG. 12 shows an alternative embodiment of the system. The same requirements for the couplers between the magnetic units, discussed above for the system of FIG. 7, are utilized in this case as well.

The magnetic levitation self-regulating system, if designated to work in weightless environment, should include at its components only the stabilization devices (FIG. 4).

The design of the stable magnetic devices of the invention is also applicable to the construction of self-regulating magnetic bearings. The bearings can work both in a gravitational field and in a weightless environment. Their iron cores can be both solid and laminated and should be covered by the permanent magnetic or superconductive strips.

Two embodiments are possible for the bearings that work in a gravitational field: one with horizontal and one with vertical pivotal axes.

To construct magnetic bearing with a horizontal pivotal axis it is necessary to bend the stabilization and levitation devices (FIG. 1) around the horizontal pivotal axis, so that their cylindrical parts form coaxial rotational bodies. Next, all the parts must be connected together by couplers, thus orienting the stabilizing forces in the stabilization and levitation devices along and perpendicular to the pivotal axis, respectively. All the iron cores should be fixed on a non-magnetic ring forming an inner resolvable race of the bearing, which is disposed on the shaft of the working body. All the magnetic units should be also be connected and attached to another non-magnetic ring forming an outer stationary race of the bearing.

The lengths of the couplers between the magnetic units of the stabilization devices and the outer race should be adjustable in a vertical direction and are a function of the weight of the working body.

Figure 9:
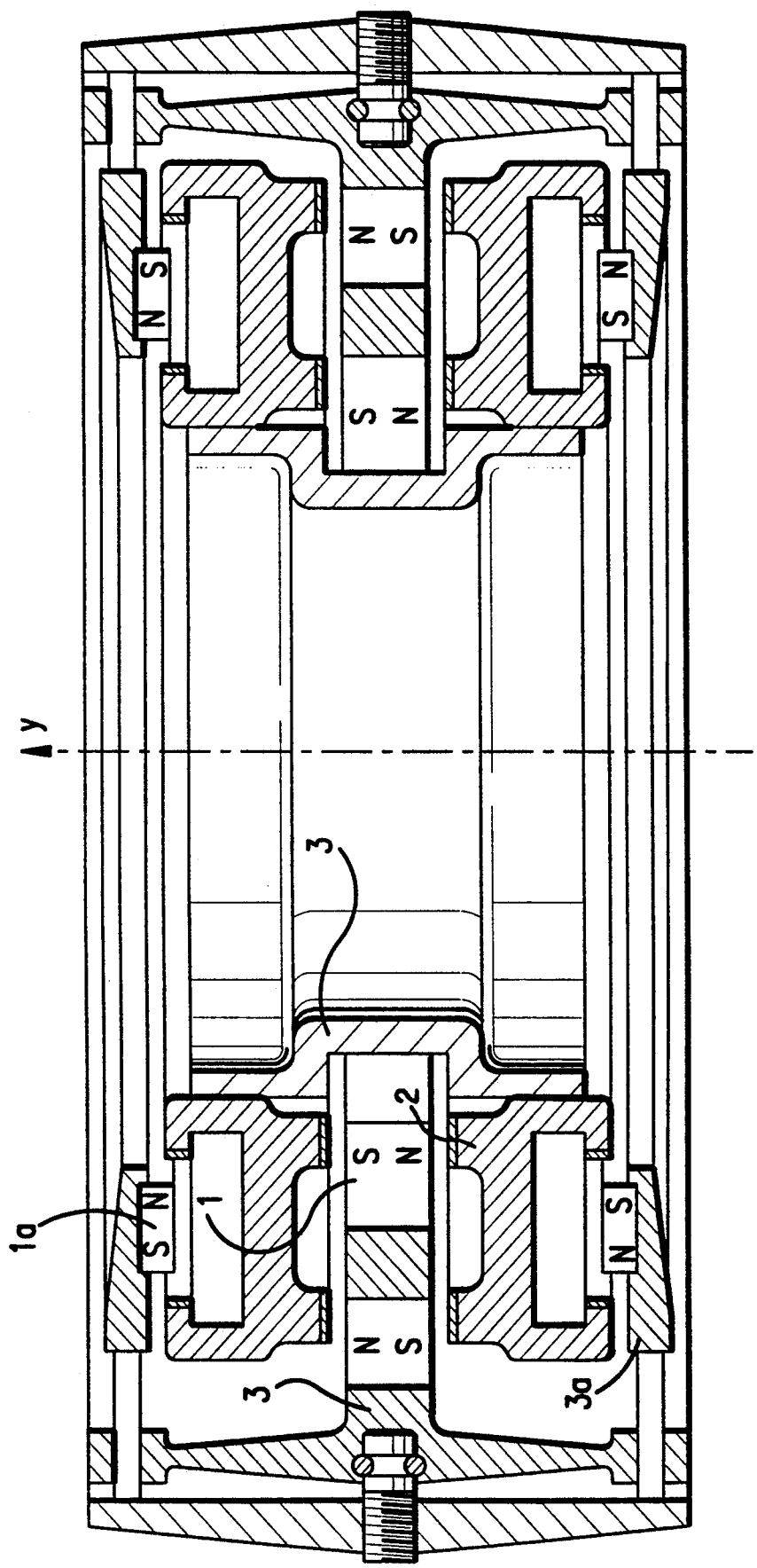
FIG. 9 is a cross-sectional view of a magnetic bearing with a horizontal pivotal axis designated to work in a gravitational field.

FIG. 9 shows another embodiment of the invention that has a horizontal pivotal axis. To design of the magnetic bearing with a vertical pivotal axis, it is also necessary to bend the stabilization and levitation devices (FIG. 7) around the vertical pivotal axis, so that their cylindrical parts form coaxial rotational bodies. It is then necessary to connect together all the parts with couplers, orienting the stabilizing forces, vice versa, in the levitation and stabilization devices along and perpendicular to the pivotal axis, respectively. All the iron cores, as well as the bearings with a horizontal pivotal axis, should be fixed on a non-magnetic ring forming an inner race of the bearing which is disposed on the shaft of the working body. All the magnetic units should also be connected and attached to another non-magnetic ring forming an outer stationary race of said bearing.

The lengths of the couplers between the magnetic units of the stabilization devices and the outer race should be adjustable in a vertical direction and are a function of the weight of the working body.

Figure 10:
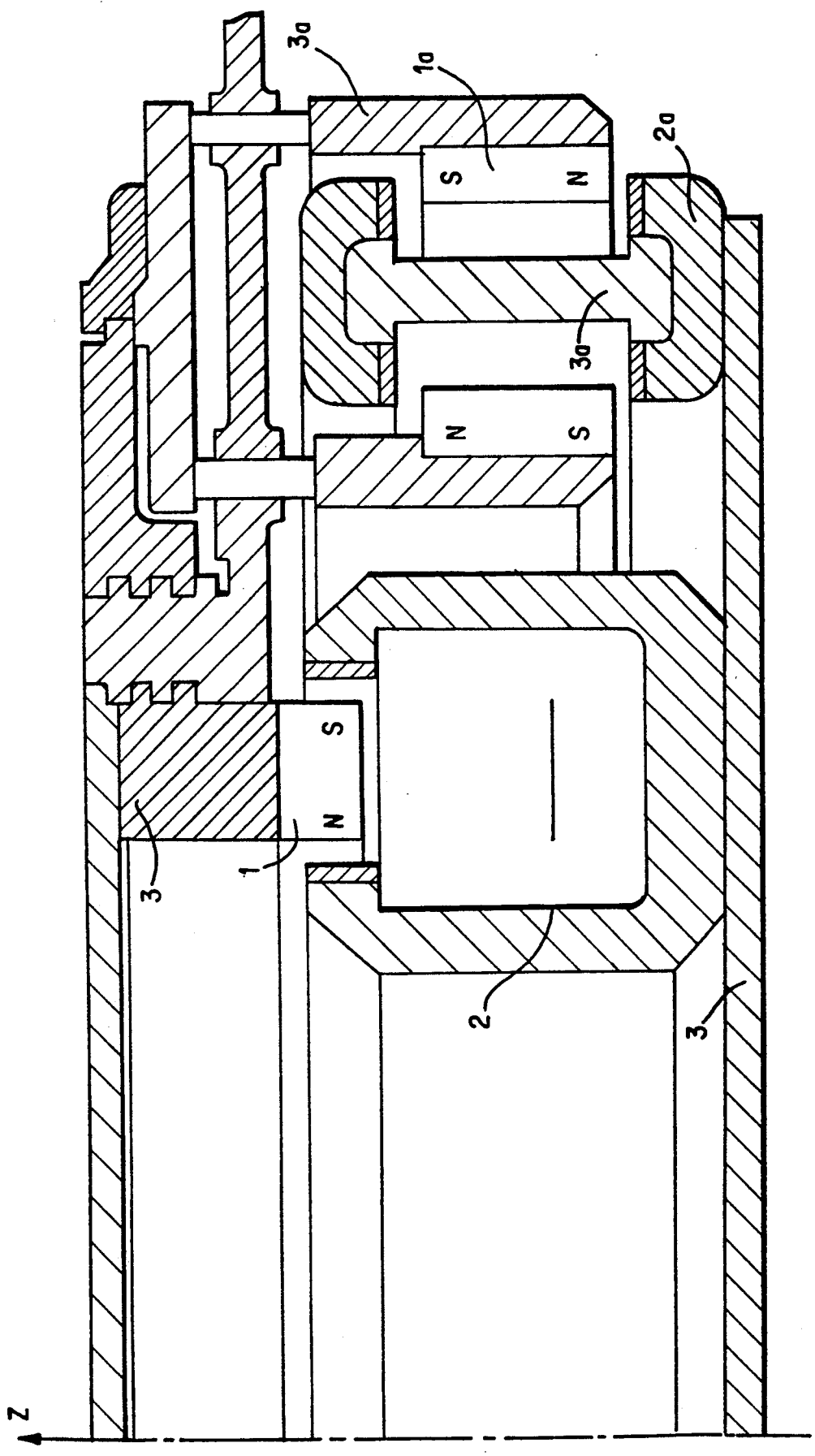
FIG. 10 is a cross-sectional view of a magnetic bearing with vertical pivotal axis designated to work in a gravitational field.

FIG. 10 shows yet another embodiment of the magnetic bearings of the invention.

To design the magnetic bearing for rotation of the working body in a weightless environment, only the stabilization devices (FIG. 4) can be used. These devices should be bent in a manner similar to those described above. The only difference in this embodiment is that the devices should be connected in such a way as to allow some of the stabilizing forces to be oriented along the pivotal axis with the remaining forces oriented perpendicular to the pivotal axis. Another distinction of this embodiment is that all the magnetic units are rigidly attached to the non-magnetic outer race of the bearing.

Figure 11A:
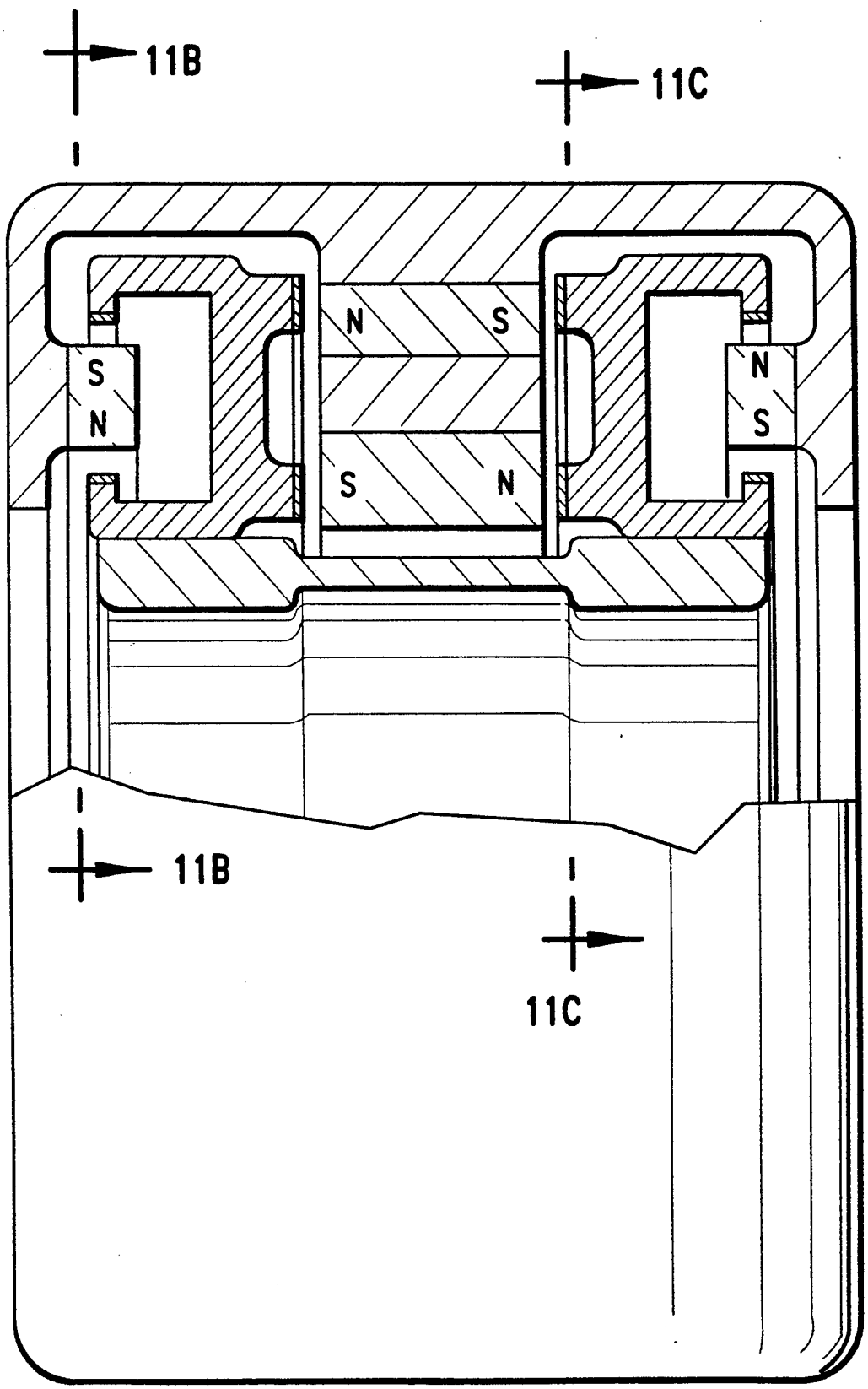
FIG. 11 is a cross-sectional view of a magnetic bearing designated to work in weightlessness and constructed according to the principles of the present invention.
Figure 11C:
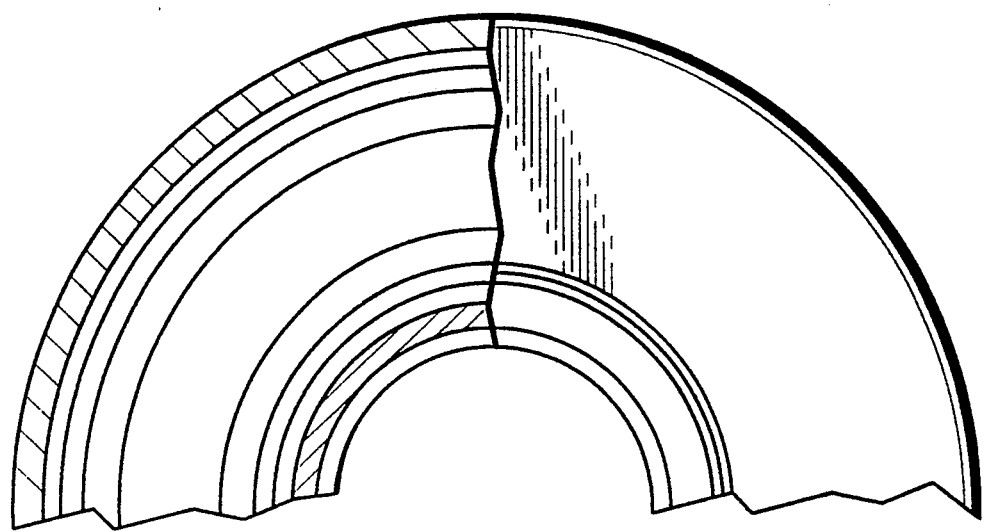
Figure 11B:
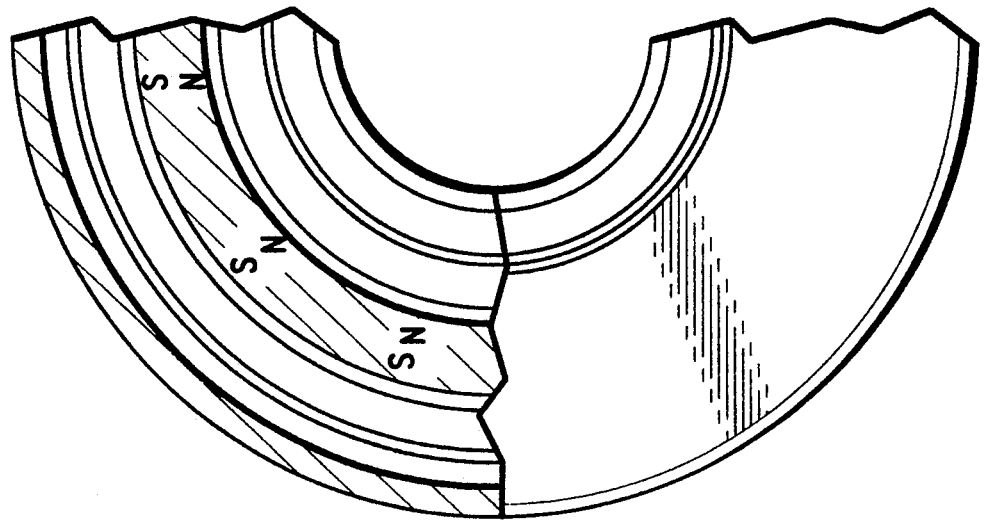

The design of the magnetic bearing used under weightless conditions is shown in FIG. 11.

What I claim is:

1. A magnetic levitation self-regulating system having enhanced stabilization forces comprising:
    a stator assembly including,
        a common foundation;
        a plurality of iron cores having a symmetrical C-shaped cross section and an air gap between its core shoes, wherein said iron cores are fixed on said common foundation by rigid non-magnetic ties, and
        magnetic screens disposed on parts of the surface of the core shoes of said plurality of iron cores;
    a levitator assembly including,
        a plurality of permanent magnets each having a rectangular cross section and each disposed in an air gap of one of said plurality of iron cores,
        wherein said permanent magnets are connected together by rigid non-magnetic ties;
    wherein said magnetic screens are formed in parts of the surface of a respective core shoe that are opposed to poles of a permanent magnet disposed in the air gap of said respective core; and
    wherein said permanent magnets of said levitator assembly generate an original magnetic field and magnetize the iron cores of said stator assembly which in turn create a secondary magnetic field and said magnetic screens change a direction of said original and secondary magnetic fields to create stabilization forces.

2. A magnetic levitation self-regulating system having enhanced stabilization forces of claim 1, wherein a working magnetic flux of the resultant magnetic field in the air gap is divided into three parts: a) a central part of the magnetic flux, that penetrates into a body of a core projection through part of its surface opposed to a permanent magnet pole; b) two adjacent parts of the magnetic flux, penetrating into the body of core projection through two adjacent lateral faces of its surface; said central part creating destabilizing force only, while said adjacent parts of the magnetic flux create stabilizing forces only, directed along the air gap, pulling the permanent magnet in the gap between the core shoes and tending to return said magnet back to its equilibrium position; wherein the stable hovering of said levitator assembly is provided by suppression of the destabilizing forces with the help of said magnetic screens and rigid non-magnetic couplers connecting together all steel cores of said stator assembly and all magnets of said levitator assembly separately.

3. A magnetic levitation self regulation system having enhanced stabilization forces of claim 2 wherein all permanent magnets of the levitator assembly are composed from short identical cylindrical pieces of alternating polarity and all parts of the surface of the stator assembly's core projections located opposite the magnet poles of said levitator assembly are covered by non-magnetic conductive strips of high electric conductivity; wherein during movement the permanent magnets induce eddy currents into the non-magnetic conductive strips, these eddy currents have such direction and value that the strips become impermeable for said central parts of the magnetic flux.

4. A magnetic leviation self-regulating system having enhanced stabilization forces of claim 2 wherein all parts of the surface of the stator assembly's core projections, located opposite the magnets of the levitator assembly, are covered by permanent magnetic strips impermeable for said central parts of the magnetic flux.

5. A magnetic levitation self-regulating system having enhanced stabilization forces of claim 2 wherein all parts of the surface of the stator assembly's core projections, located opposite the magnets of the levitator assembly, are covered by superconductive strips impermeable for said central parts of the magnetic flux.

6. The system of claim 1 wherein a combination of a permanent magnet from said levitator assembly and a core from said stator assembly form a magnetic device wherein the system comprises a plurality of magnetic devices.

7. A magnetic levitation self regulation system having enhanced stabilization forces of claim 6 wherein the stabilizing force increases while levitator assembly displacement grows along the said air gap until it reaches a maximum at a first displacement and then decreases though the displacement continues to grow and simultaneously, a stabilizing force stiffness also increases, reaches its maximum on a certain value of the displacement $\Delta_0$, and then decreases.

8. A magnetic levitation self regulation system having enhanced stabilization forces of claim 7 wherein two identical magnetic devices are composed of cylinder generatrixes parallel to each other and coupled together, forming a stabilization device wherein two said coupled magnetic devices form a magnetic unit with a length of a non-magnetic coupler between the two iron cores different from a length of coupler between the two permanent magnets by value $2\Delta_0$; wherein a stabilizing force stiffness applied to said magnetic unit in the vicinity of its equilibrium position equals a double of the maximum value of the stabilizing force stiffness of the single magnetic device.

9. A magnetic levitation self regulation system having enhanced stabilization forces of claim 8 wherein two identical magnetic devices are composed of their cylinder generatrixes parallel to each other and coupled together, forming a levitation device wherein lengths of two couplers between the two iron cores and between the two permanent magnets respectively are equal to each other and the stabilizing force applied to magnetic unit, as well as its stiffness, is doubled.

10. A magnetic levitation self regulating system having enhanced stabilizational forces of claim 9 designated to provide forward motion of a working body in a gravity field, wherein said levitation and stabilization devices are disposed so that their cylinder generatrixes are parallel to the direction of the movement of the working body; said devices are connected in such a manner that the stabilizing forces therein are oriented:
 a. in said stabilization devices, horizontally,
 b. in said levitation devices, vertically; and wherein lengths of couplers connecting said stabilization devices with said assembly levitator are adjustable for preliminary tuning, depending on a weight of the working body.

11. The system of claim 1 wherein said magnetic screens are strips selected from the group consisting of superconductive strips and permanent magnetic strips wherein said stabilization forces provide a stable hovering of said levitator assembly in a resultant magnetic field of the system while in its stationary position.

12. The system of claim 1 wherein said magnetic screens comprise non-magnetic conductive strips and said stator and levitator assemblies are cylindrical in nature wherein said stabilization forces provide a stable hovering of said levitator assembly in a resultant magnetic field of the system while in motion along one axis.

13. A magnetic levitation self-regulating system having enhanced stabilization forces designated to provide rotation of a working body, having a shaft, around a horizontal axis in a gravity field, comprising a plurality of stabilization devices and a plurality of levitation devices wherein said stabilization devices are bent and having cylindrical parts forming toroidal coaxial rotation bodies and then connected together by couplers, orienting the stabilizing forces in said devices along pivotal axes while said levitation devices are bent and having cylindrical parts forming toroidal coaxial rotation bodies and then connected by couplers to orient stabilizing forces in said device perpendicular to the pivotal axes; said stabilization and levitation devices each having iron cores fixed on a non-magnetic ring, forming an inner race of a bearing fitted on the shaft of the working body; each of said stabilization and levitation devices having a permanent magnet and all said iron cores can be both solid and laminated and all parts of the surface of their core projections, located opposite permanent magnet poles, are covered by a magnetic screen; all said stabilization and levitation devices also connected and attached to another non-magnetic ring, forming an outer stationary race of said bearing; wherein lengths of couplers between the stabilization devices and said outer race are adjustable in a vertical direction depending on a weight of said working body.

14. A magnetic levitation self-regulating system having enhanced stabilization forces designated to provide rotation of a working body having a shaft around a pivotal axis in a weightless environment, which involves a magnetic bearing, including a plurality of stabilization devices, said stabilization devices having cylindrical parts being bent to form coaxial rotation bodies and then connected together by ties in such a manner that some of them generate stabilizing forces oriented along the pivotal axis, and others generate stabilizing forces oriented perpendicularly to the pivotal axis; all of said stabilization devices having an iron core wherein all the iron cores of said devices are fixed on a non-magnetic ring forming an inner race of a bearing fitted on the shaft of the working body; each of said stabilization devices having a permanent magnet and all said iron cores can be both solid and laminated and all parts of the surface of their core projections, located opposite the permanent magnet poles, are covered by magnetic screens wherein all of said stabilization devices are also connected and attached to another non-magnetic ring forming an outer stationary race of said bearing.

15. A magnetic levitation self-regulating system having enhanced stabilization forces designated to provide rotation of a working body, having a shaft, around a horizontal axis in a gravity field comprising a plurality of stabilization devices which are bent and having cylindrical parts forming toroidal coaxial rotation bodies and then connected together by couplers, orienting the stabilizing forces in said stabilizing devices along pivotal axes, and a plurality of levitation devices, said levitation devices bent and having cylindrical parts forming toroidal coaxial rotation bodies and then connected by couplers to orient stabilizing forces in said levitation devices perpendicular to the pivotal axes; all the iron cores of said devices are fixed on a non-magnetic ring, forming an inner race of said bearing fitted on the shaft of the working body; said stabilization and levitation devices having iron cores that can be both solid and laminated and further having permanent magnet, wherein all parts of the surface of their core projections, located opposite the permanent magnet poles, are covered by a magnet screen; all said stabilization and levitation devices are also connected and attached to another non-magnetic ring, forming an outer stationary race of said bearing; lengths of the couplers between the stabilization devices and said outer race are adjustable in a vertical direction depending on a weight of said working body.

* * * * *